(12) United States Patent
Lindenmeier et al.

(10) Patent No.: US 8,107,557 B2
(45) Date of Patent: Jan. 31, 2012

(54) RECEPTION SYSTEM HAVING A SWITCHING ARRANGEMENT FOR SUPPRESSING CHANGE-OVER INTERFERENCE IN THE CASE OF ANTENNA DIVERSITY

(75) Inventors: Heinz Lindenmeier, Planegg (DE); Stefan Lindenmeier, Gauting-Buchendorf (DE); Jochen Hopf, Haar (DE); Leopold Reiter, Gilching (DE)

(73) Assignee: Delphi Delco Electronics Europe GmbH, Troy, MI (US)

( * ) Notice: Subject to any disclaimer, the term of this patent is extended or adjusted under 35 U.S.C. 154(b) by 941 days.

(21) Appl. No.: 12/101,328

(22) Filed: Apr. 11, 2008

(65) Prior Publication Data

US 2008/0260079 A1 Oct. 23, 2008

(30) Foreign Application Priority Data

Apr. 13, 2007 (DE) .......................... 10 2007 017 478

(51) Int. Cl.
*H03K 9/00* (2006.01)
(52) U.S. Cl. .......... 375/316; 455/78; 455/272; 455/273; 370/339
(58) Field of Classification Search .................. None
See application file for complete search history.

(56) References Cited

U.S. PATENT DOCUMENTS

| | | |
|---|---|---|
| 3,942,119 A | 3/1976 | Meinke et al. |
| 4,070,677 A | 1/1978 | Meinke et al. |
| 4,095,228 A | 6/1978 | Meinke et al. |
| 4,602,260 A | 7/1986 | Lindenmeier et al. |
| 4,752,968 A | 6/1988 | Lindenmeier et al. |
| 4,791,426 A | 12/1988 | Lindenmeier et al. |
| 4,914,446 A | 4/1990 | Lindenmeier et al. |
| 5,029,308 A | 7/1991 | Lindenmeier et al. |
| 5,049,892 A | 9/1991 | Lindenmeier et al. |
| 5,097,270 A | 3/1992 | Lindenmeier et al. |
| 5,138,330 A | 8/1992 | Lindenmeier et al. |
| 5,266,960 A | 11/1993 | Lindenmeier et al. |
| 5,289,197 A | 2/1994 | Lindenmeier et al. |
| 5,303,396 A * | 4/1994 | Ooyagi et al. ............... 455/134 |
| 5,313,660 A | 5/1994 | Lindenmeier et al. |
| 5,589,839 A | 12/1996 | Lindenmeier et al. |
| 5,619,214 A | 4/1997 | Lindenmeier et al. |
| 5,801,663 A | 9/1998 | Lindenmeier et al. |

(Continued)

FOREIGN PATENT DOCUMENTS

DE 3517247 11/1986

(Continued)

OTHER PUBLICATIONS

U.S. Appl. No. 12/689,969, filed Jan. 19, 2010.

(Continued)

*Primary Examiner* — David C. Payne
*Assistant Examiner* — Adolf Dsouza
(74) *Attorney, Agent, or Firm* — J. Gordon Lewis

(57) ABSTRACT

A diversity processing system for providing interference masking signals in an interference suppression circuit. These interference masking signals are generated by an interference detector which through a coupling element couples in a signature signal into a reception signal. This reception signal is then passed to an amplifier, an optional frequency converter, an IF filter, a frequency demodulator and then on to an interference suppression circuit which provides a masking pulse to mask any distortion or interference associated with the diversity switching of antennas during operation.

20 Claims, 14 Drawing Sheets

U.S. PATENT DOCUMENTS

| | | | |
|---|---|---|---|
| 5,818,394 A | 10/1998 | Aminzadeh et al. |
| 5,826,179 A | 10/1998 | Lindenmeier et al. |
| 5,850,198 A | 12/1998 | Lindenmeier et al. |
| 5,905,469 A | 5/1999 | Lindenmeier et al. |
| 5,926,141 A | 7/1999 | Lindenmeier et al. |
| 5,929,812 A | 7/1999 | Aminzadeh |
| 5,949,498 A | 9/1999 | Rudolph |
| 5,973,648 A | 10/1999 | Lindenmeier et al. |
| 6,011,962 A | 1/2000 | Lindenmeier et al. |
| 6,123,550 A | 9/2000 | Burkert et al. |
| 6,130,645 A | 10/2000 | Lindenmeier et al. |
| 6,140,969 A | 10/2000 | Lindenmeier et al. |
| 6,169,888 B1 | 1/2001 | Lindenmeier et al. |
| 6,184,837 B1 | 2/2001 | Lindenmeier et al. |
| 6,188,447 B1 | 2/2001 | Rudolph et al. |
| 6,218,997 B1 | 4/2001 | Lindenmeier et al. |
| 6,236,372 B1 | 5/2001 | Lindenmeier et al. |
| 6,313,799 B1 | 11/2001 | Thimm et al. |
| 6,317,096 B1 | 11/2001 | Daginnus et al. |
| 6,377,221 B1 | 4/2002 | Lindenmeier et al. |
| 6,400,334 B1 | 6/2002 | Lindenmeier et al. |
| 6,421,532 B1 | 7/2002 | Lindenmeier et al. |
| 6,430,404 B1 | 8/2002 | Lindenmeier et al. |
| 6,574,460 B1 | 6/2003 | Lindenmeier et al. |
| 6,603,434 B2 | 8/2003 | Lindenmeier et al. |
| 6,603,435 B2 | 8/2003 | Lindenmeier et al. |
| 6,611,677 B1 | 8/2003 | Lindenmeier et al. |
| 6,633,258 B2 | 10/2003 | Lindenmeier et al. |
| 6,653,982 B2 | 11/2003 | Lindenmeier et al. |
| 6,768,457 B2 | 7/2004 | Lindenmeier |
| 6,888,508 B2 | 5/2005 | Lindenmeier |
| 6,911,946 B2 | 6/2005 | Lindenmeier |
| 6,917,340 B2 | 7/2005 | Lindenmeier |
| 6,925,293 B2 | 8/2005 | Lindenmeier et al. |
| 6,927,735 B2 | 8/2005 | Lindenmeier et al. |
| 6,956,533 B2 | 10/2005 | Lindenmeier |
| 7,127,218 B2 | 10/2006 | Lindenmeier |
| 7,403,167 B2 | 7/2008 | Probst et al. |
| 7,555,277 B2 | 6/2009 | Lindenmeier et al. |
| 7,564,416 B2 | 7/2009 | Lindenmeier et al. |
| 7,702,051 B2 | 4/2010 | Lindenmeier et al. |
| 2001/0016478 A1 | 8/2001 | Lindenmeier et al. |
| 2002/0118138 A1 | 8/2002 | Lindenmeier et al. |
| 2002/0126055 A1 | 9/2002 | Lindenmeier et al. |
| 2002/0154059 A1 | 10/2002 | Lindenmeier et al. |
| 2002/0171600 A1 | 11/2002 | Lindenmeier et al. |
| 2002/0196183 A1 | 12/2002 | Lindenmeier |
| 2003/0164802 A1 | 9/2003 | Lindenmeier |
| 2004/0113854 A1 | 6/2004 | Lindenmeier |
| 2004/0160373 A1 | 8/2004 | Lindenmeier |
| 2004/0164912 A1 | 8/2004 | Lindenmeier et al. |
| 2004/0183737 A1 | 9/2004 | Lindenmeier |
| 2004/0198274 A1 | 10/2004 | Lindenmeier |
| 2006/0082494 A1 | 4/2006 | Deininger et al. |
| 2006/0114146 A1 | 6/2006 | Lindenmeier et al. |
| 2006/0182201 A1 | 8/2006 | Lindenmeier et al. |
| 2007/0058761 A1 | 3/2007 | Lindenmeier |
| 2007/0140389 A1 | 6/2007 | Lindenmeier et al. |
| 2008/0218422 A1 | 9/2008 | Lindenmeier et al. |
| 2008/0248770 A1 | 10/2008 | Schultz et al. |
| 2009/0036074 A1 | 2/2009 | Lindenmeier et al. |
| 2009/0042529 A1 | 2/2009 | Lindenmeier et al. |
| 2009/0073072 A1 | 3/2009 | Lindenmeier et al. |
| 2010/0066618 A1 | 3/2010 | Heuer |

FOREIGN PATENT DOCUMENTS

DE 4204490 8/1993

OTHER PUBLICATIONS

U.S. Appl. No. 12/716,318, filed Mar. 3, 2010.
U.S. Appl. No. 12/786,236, filed May 24, 2010.

\* cited by examiner

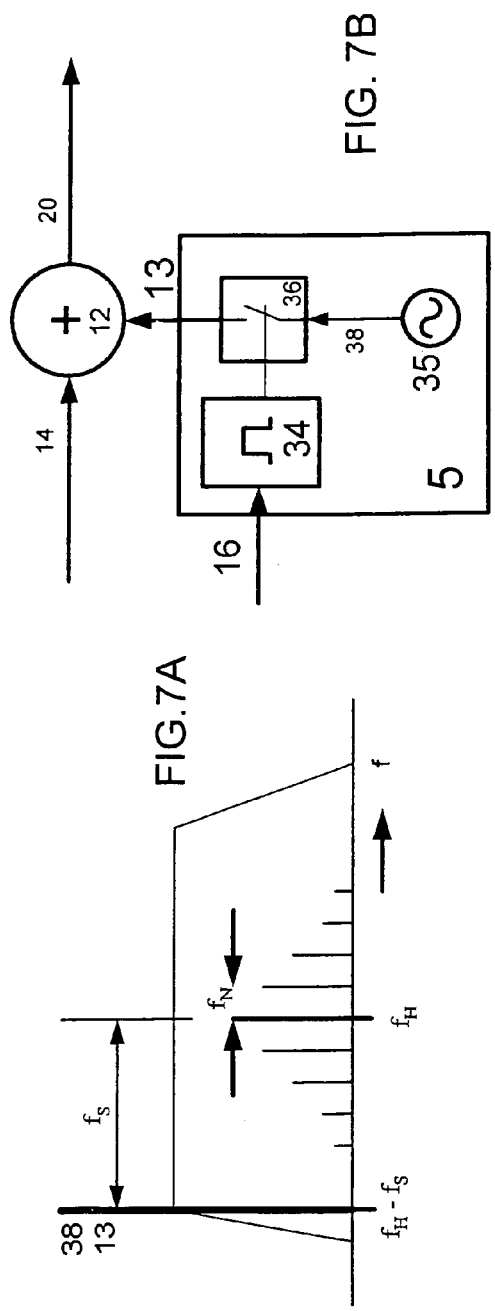
FIG. 7A
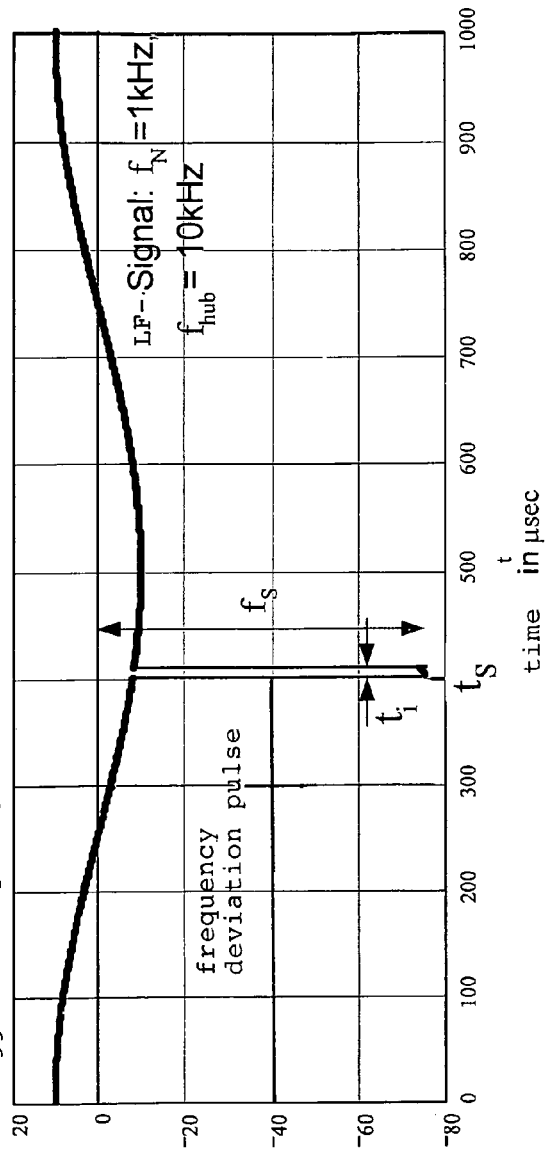
FIG. 7B
FIG. 7C

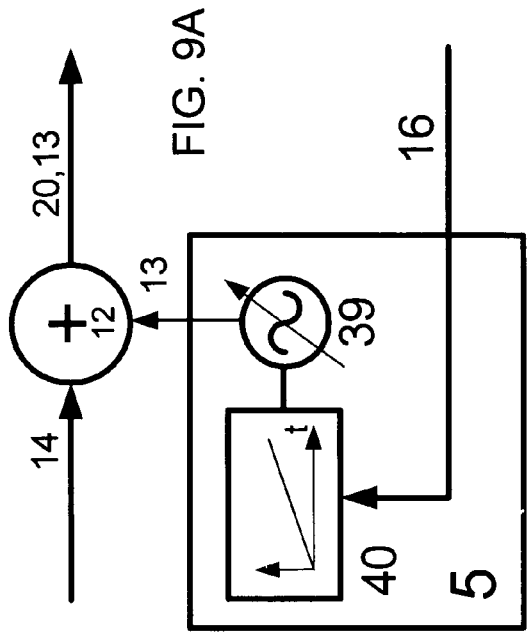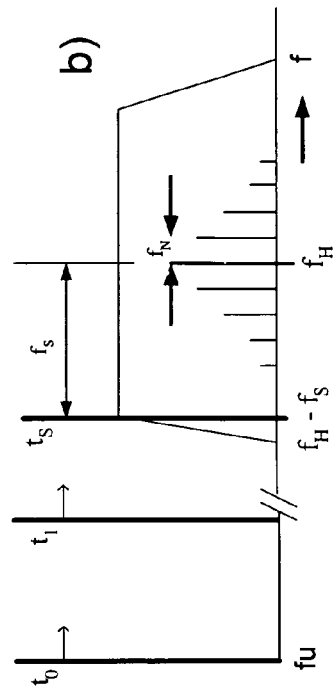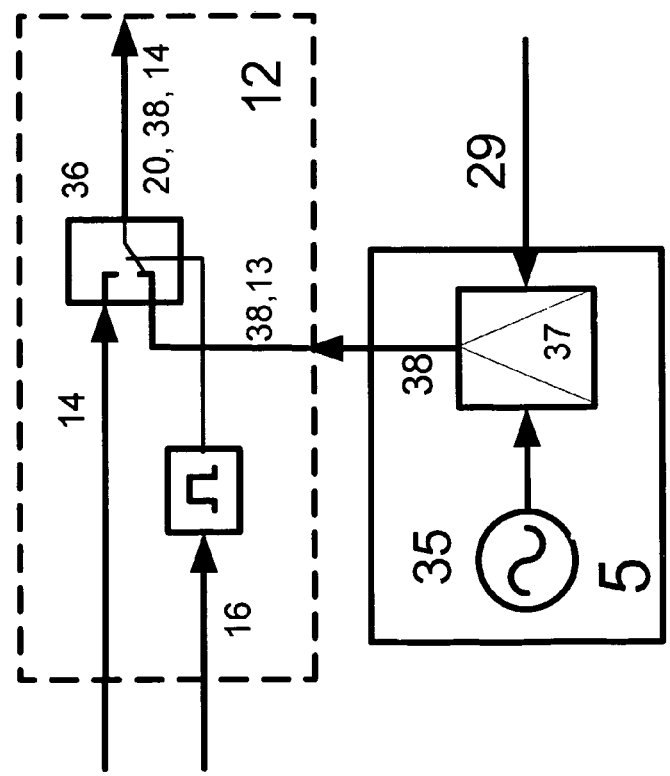
FIG. 9A
FIG. 9B
FIG. 8

RECEPTION SYSTEM HAVING A SWITCHING ARRANGEMENT FOR SUPPRESSING CHANGE-OVER INTERFERENCE IN THE CASE OF ANTENNA DIVERSITY

CROSS REFERENCE TO RELATED APPLICATIONS

This application claims priority from German Application serial No. DE 10 2007 017 478.2 filed on Apr. 13, 2007, the disclosure of which is hereby incorporated herein by reference in its entirety.

BACKGROUND

The invention relates to a reception system having a switching arrangement for suppressing change-over interference in the base band range of a multi-antenna scanning diversity system. In this case, there is a diversity processor that is present, to which the antenna signals are passed on the input side, and which generates a switching signal for changing over to a different antenna signal if disadvantageous reception conditions such as interference are present. The device also has an interference suppression circuit situated in the base band part, and interference masking signals that are passed to this circuit, which signals are derived, in the diversity processor, from the switching signals for changing over to a different antenna signal.

Arrangements in this general field are found in DE 3517247 A1 or U.S. Pat. No. 4,752,968 to Lindenmeier et al, the disclosure of which is hereby incorporated herein by reference. In the case of the antenna diversity reception system described there, for the elimination of interference, a number of antenna signals is passed to a diversity processor, from which a selected antenna signal is switched through to the receiver at all times. This high-frequency signal is converted to the intermediate-frequency range IF, and this signal is passed to the diversity processor for the recognition of interference. If interference is recognized, switching signals for switching over to a different antenna signal A1 ... AN are derived in the diversity processor, and bring about the change-over in the antenna change-over switch. In general, an amplitude jump or phase jump is connected with the change-over process in the high-frequency branch. This change-over can lead to audible switching noises if the interference suppression in the low-frequency range is insufficient. For this reason, it is proposed in DE 3517247 or U.S. Pat. No. 4,752,968 to use the change-over pulses formed in the diversity processor also to control a sample and hold circuit in the audio branch. If the diversity processor is contained in the receiver, the connection between diversity processor and receiver can be produced without much effort.

A further switching arrangement for suppressing change-over interference in the audio frequency range in the case of reception of frequency-modulated audio signals with a multi-antenna scanning diversity system is known from DE 42 04 490, the disclosure of which is hereby incorporated herein by reference. In the case of this circuit, it is provided that one of the connection lines between the diversity processor 1 and the receiver 4 that are required for functionality of the diversity system and are already present is also used for this purpose. In this connection, the change-over pulses are additionally passed to the interference suppression circuit, by way of one of these connection lines, by way of selection means, in such a manner that the other signals transmitted by way of these lines are not disrupted.

These known switching arrangements all have in common that it is very difficult to produce the precise simultaneity of the change-over pulse for triggering the interference suppression in the interference suppression circuit and the occurrence of the interference in the audio signal. This is mainly due to the delay of the reception signals, which necessarily exists due to the frequency restriction to the channel bandwidth of the receiver and the subsequent restriction to the audio frequency bandwidth, as well as due to possible delays in a digital signal processor.

In the case of a statically predetermined frequency band restriction due to the channel band filter, the running time equalization can be fundamentally produced, but unfortunately with difficulty. With modern receivers that are equipped with a dynamic bandwidth regulation for protection against adjacent channel interference, this running time equalization is, of course, impossible. Because triggering of the interference suppression in the interference suppression circuit is imprecise, in terms of time, the interference caused by the change-over cannot be sufficiently suppressed, so that the measures become ineffective.

SUMMARY

One embodiment of the invention is designed to produce the simultaneity of the triggering of the interference suppression in an interference suppression circuit that is caused by the change-over pulse, and the occurrence of the interference in the audio signal, so that a clear reduction in the interference that accompanies the change-over of the antenna signals occurs.

The invention relates to a reception system having a switching arrangement for suppressing change-over interference in a base band range of a multi-antenna scanning diversity system. The reception system comprises a plurality of antennas, and a diversity processor for receiving antenna signals from the plurality of antennas. This diversity processor is adapted to generate antenna change-over signals for changing over to a different antenna signal if distorted reception conditions or interference reception conditions are present. In this case, interference conditions in a signal should be construed broadly to at least include distortion conditions in a signal as well. There is also an interference suppression circuit situated in a base band part of the system for receiving interference-masking-signals, which are derived in the diversity processor from switching signals for changing over to a different antenna signal. There is also an interference detector for checking for interference in the reception signal. This interference detector is in communication with the diversity processor. In this case, this interference detector is for creating switching signal pulses for changing over to a different antenna signal and for causing a pulse-like signature signal which is fed into a signal path of the reception signals. There is also a coupling element or switch for coupling in a pulse like signature signal with the antenna reception signals for time marking a change-over process that occurs in coordination with switching the coupling element. There is also a reception channel filter of the reception system that limits a frequency band, wherein the reception channel filter is disposed downstream from the coupling element. This interference suppression circuit initiates interference masking from a base band signature signal formed after the reception channel filter.

Exemplary embodiments of the invention are presented in the following figures. These show:

FIG. 1 is a schematic block diagram of a reception system according to the state of the art;

FIG. 2: is a schematic block diagram of a first embodiment of a reception system having a signature signal switch or summation element;

FIG. 7A is a graph of a spectral line of a signature signal carrier as the signature signal with the frequency departure $f_S$ from the high-frequency carrier $f_H$;

FIG. 7B is a schematic block diagram of a signature signal formation;

FIG. 7C is graph of a time progression of the frequency deviation of a high-frequency carrier modulated in frequency with an audio signal;

FIG. 8 is a schematic block diagram showing an oscillator oscillation 29 signal of the receiver which is passed to the signature signal formation unit;

FIG. 9A shows a schematic block diagram of a signature signal formation element in communication with a coupling element/switch;

FIG. 9B is a view of a graph showing representation of the spectral line of the signature signal 13 at different time points $t_0$, $t_1$, $t_S$ while passing through the ramp function;

DETAILED DESCRIPTION

Figure 1:
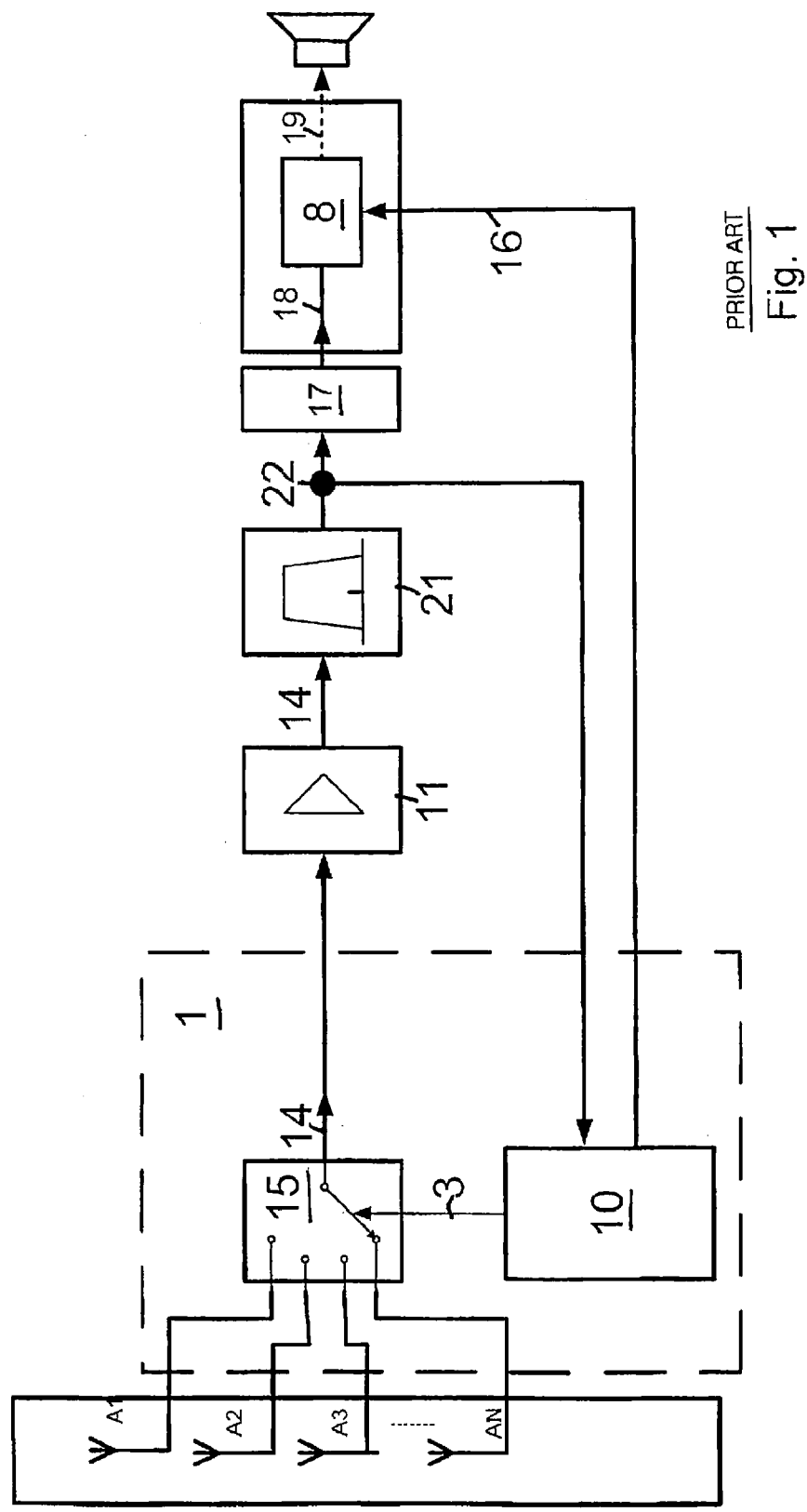

Referring in detail to the drawings, FIG. 1 shows the antenna system according to the prior art, with multiple antennas A1 ... AN, diversity processor 1, reception channel filter 21, reception channel signal 22 for determining reception interference, with interference detector 10, and a feed line for the switching signal pulses 16 to the interference suppression circuit 8, by way of a separate line, separate from the signal path of the reception signals 14.

Figure 2:
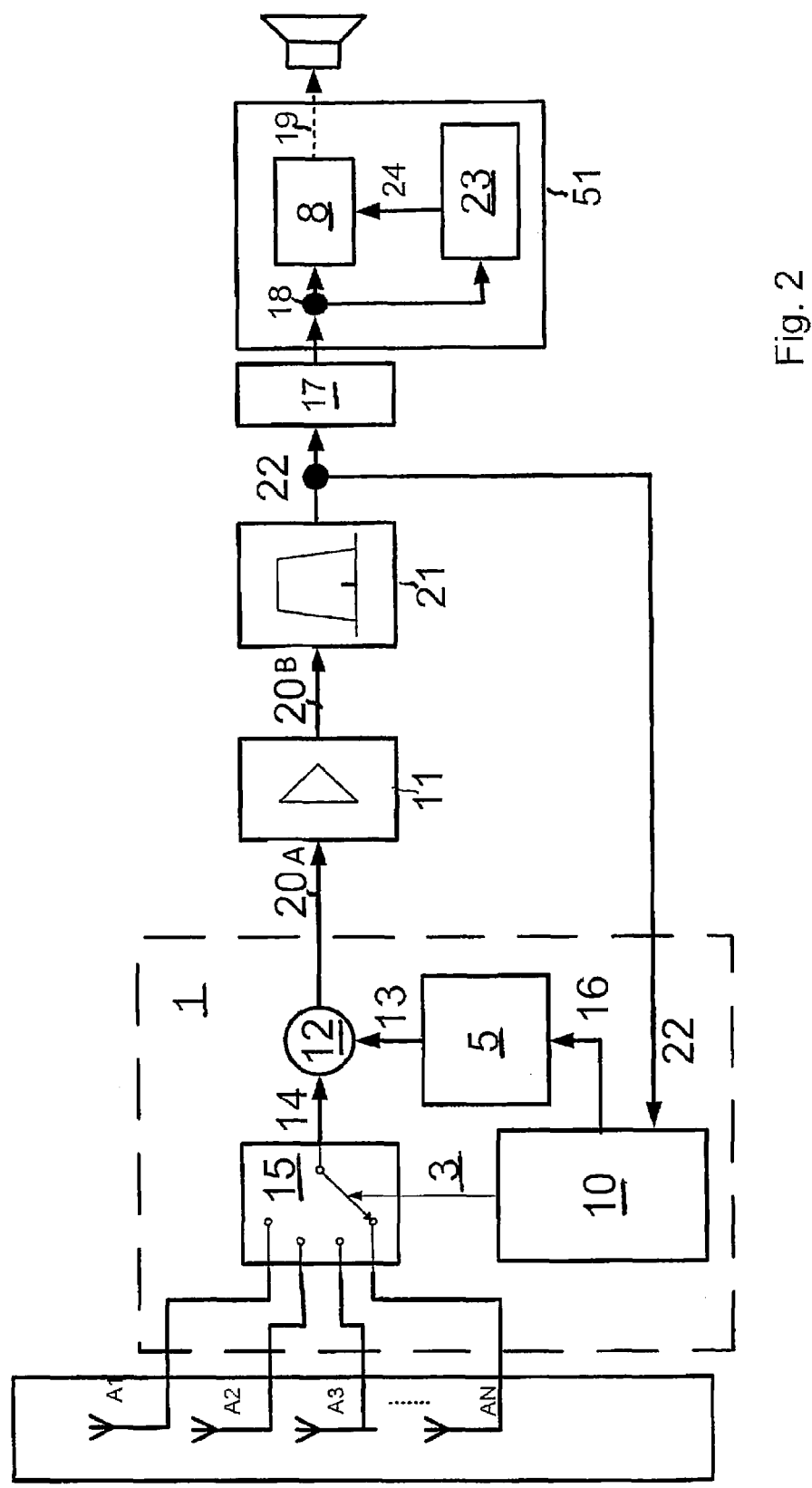

FIG. 2 therefore shows the reception system according to one embodiment of the invention, with feed of a pulse-like signature signal 13 derived from the switching signal pulse 16 in the signature signal formation unit 5. This occurs by way of the signature signal switch or coupling element 12, which inserts this pulse like signature signal into the signal path of the reception signal 14, for marking the reception signals with the time point of the change-over of the antenna signal that took place practically at the same time, with the antenna change-over signal 3. The interference masking signal 24 is derived from the base band signature signal 18 at the output of the base band processor 17, in the signature signal evaluation 23, and the masking process is directly triggered in the interference suppression circuit 8.

One of the advantages of the invention results in the precise time masking of the interference that is connected with the transient oscillation process of the channel band filter when switching over to a different antenna signal, as well as the restriction to the audio frequency range that might also be present. Particularly, in the case of ultra-short-wave reception—in which the channel band filter 21 is generally formed by the IF filter 21 of a superimposition receiver 4—and very particularly in the case of classical music, residual interference can become audible when switching over to a different antenna signal. Unfortunately, this interference cannot be determined separately from the signal content, in the audio signal, and masked. The width of the frequency interference deviation pulse that occurs during the change-over corresponds to a delay of approximately 7 µs at a frequency band width of the channel band filter 21 of 150 kHz, for example.

Delays that such a pulse experiences when passing through this filter amount to approximately 20 µs. A further band restriction of the signal after demodulation to 15 kHz brings about another delay, the magnitude of which amounts to about 100 µs. In this connection, the interference pulse is spread to approximately 30-70 µs, in terms of time. Thus, a time duration $t_A$ of interference masking after this band restriction of up to 70 µs has proven to be advantageous, after which the transient oscillation process after the frequency band restriction when switching over to a different antenna signal has died down. However, the interference energy connected with such a pulse is so small that the beginning of this pulse cannot be reliably determined in the receiver and cannot be used to trigger the interference suppression. The pulse is therefore not small enough so that change-over interference would not be audible, but on the other hand is not large enough, with its rising flank, to bring about triggering of the interference suppression.

Therefore, one goal is to clearly mark the time point of change-over in the reception signal 14, ahead of the channel band filter, with a pulse-like signature signal 13, which is evaluated in the receiver 4 to initiate masking of the interference connected with the change-over process in the interference suppression circuit 8. With this, the start of the interference, in terms of time, is given by the transient oscillation after the change-over of the antenna signal, in the interference suppression circuit 8, and the occurrence of the signature signal 13 all the way to the audio frequency plane, because the running times in the frequency band filtering are the same. In this connection, it is particularly advantageous if the pulse-like signature signal 13 takes place immediately before the change-over, and the rise time of the pulse-like signature signal 13 is very small in comparison with the masking time, and the pulse is selected to be large enough so that triggering of the interference suppression in the receiver takes place in reliable manner. Thus, not only is the interference brought about by the pulse-like signature signal 13 inaudible, but also interference brought about by the change-over process itself is inaudible, by means of the direct triggering of the interference suppression.

Thus, FIG. 2, shows a schematic block diagram showing a series of antennas A1, A2, A3, . . . AN having their output coupled into a diversity processor 1. Diversity processor 1 includes an antenna signal change-over switch 15, for receiving antenna signals from the antenna, an interference detector 10, a coupling element or signature signal switch 12, and a signature signal formation element 5. The signature signal formation 5 element is for forming the signature signal 13. The signature signal formation unit 5 is turned on by a switching signal pulse 16 given off by interference detector 10. If disadvantageous reception conditions exist, such as distortion or interference, the signature signal 13 is fed into the signal path of the reception signals 14 by way of the signature signal switch or coupling element 12. In this connection, it is particularly advantageous if the antenna change-over signal 3, which is triggered in connection with the switching signal pulse 16, is slightly delayed as compared with the signature signal 13. Thus, in this case, signature signal 13 is provided prior to the production of antenna change-over signal 3.

The output of diversity processor 1 is in the form of marked receptions signals 20A which are the combination of reception signal 14 and signature signal 13, and which is input into HF amplifier 11. The output of the HF (high frequency) amplifier 11 is fed into a reception channel filter 21. Reception channel filter 21 receives a marked reception signal 20B. This reception channel filter 21 filters marked reception signal 20B with the resulting output being a reception channel signal 22 is a combination of a filtered signal 14 with signal 13 superimposed on it. Reception channel signal 22 is passed to base band processor, or FM demodulator 17. Reception channel signal 22 is also passed to interference detector 10, to indicate reception interference.

After passing through base band processor 17, reception channel signal 22 is transformed into a base band signature signal 18 which is a combination or superimposition of filtered demodulated reception signal 14 and signature signal 13. Base band signature signal 18 is evaluated in the signature signal evaluation unit 23, in the subsequent interference masking unit 51. Interference suppression is triggered in the interference suppression circuit 8, using the interference suppression signal 24 derived and generated by signature signal evaluation unit 23. Interference masking unit 51 then passes a base band signal 19 that is produced after interference signal suppression for further output to speakers. Essentially, signature signal evaluation unit 23 determines whether to pass an interference suppression signal 24 based upon a reading of base band signature signal 18.

Figure 3:
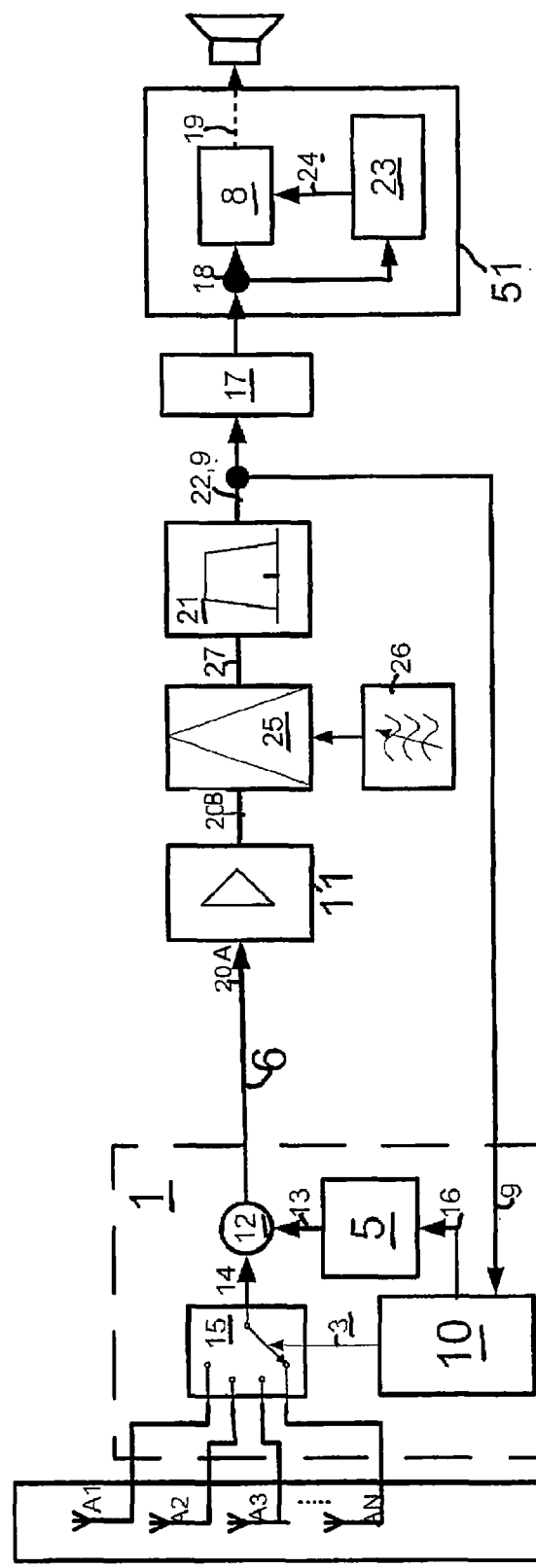
FIG. 3 shows a schematic block diagram showing a modified version of FIG. 2 but with superimposition receiver with an oscillator, a frequency mixer, and an IF filter as a reception channel filter.

In another embodiment of the invention, FIG. 3 shows the reception device that follows diversity processor 1 by way of HF line 6 that is configured in accordance with the superimposition principle. In this case, there is shown a series of antennas A1, A2, A3, . . . AN having their output in the form of antennas signals input into an antenna signal change over switch 15. The switching of this antenna signal change over switch 15 is controlled by interference detector 10. Interference detector 10 is housed within diversity processor 1 along with antenna signal change over switch 15, switch or coupling element 12, and signature signal formation element 5. Once reception signal 14 passes through coupling switch element 12, reception signal 14 is combined with signature signal 13 to form a marked reception signal 20.

The signals output from diversity element 1 are passed through high frequency (HF) line 6 to HF amplifier 11. The output of HF amplifier 11 is input into frequency converter 25. Frequency converter 25 also has an input from oscillator 26. The output of frequency converter 25 is then passed to reception channel filter 21. The output of reception channel filter 21 is then passed to FM demodulator. However IF signals 9,22 are passed back to interference detector 10 from a position between reception channel filter 21 and FM demodulator or base band processor 17.

For the reception of frequency-modulated signals, the base band processor 17 is structured as an FM demodulator 17. The reception channel filter 21 is accordingly structured as an IF filter 21, for receiving reception signals in the intermediate frequency plane 27, and IF signal 9. IF filter 21 then passes IF signal 9 to the interference detector 10 to test for interference in the reception signal 14. The IF filter 21 is followed by the FM demodulator 17. FM demodulator decouples reception channel signal 22 to form the base band signature signal 18. This signal is passed to interference masking unit 51, to which the audio or base band signature signal 18 with signature for triggering the interference suppression in the interference suppression circuit 8 is passed on the input side. Interference masking unit 51 includes both interference suppression circuit 8 and signature signal evaluation unit 23 which passes an interference masking signal 24 to interference suppression circuit 8. Interference suppression circuit 8 then passes the base band signal out.

Figure 4:
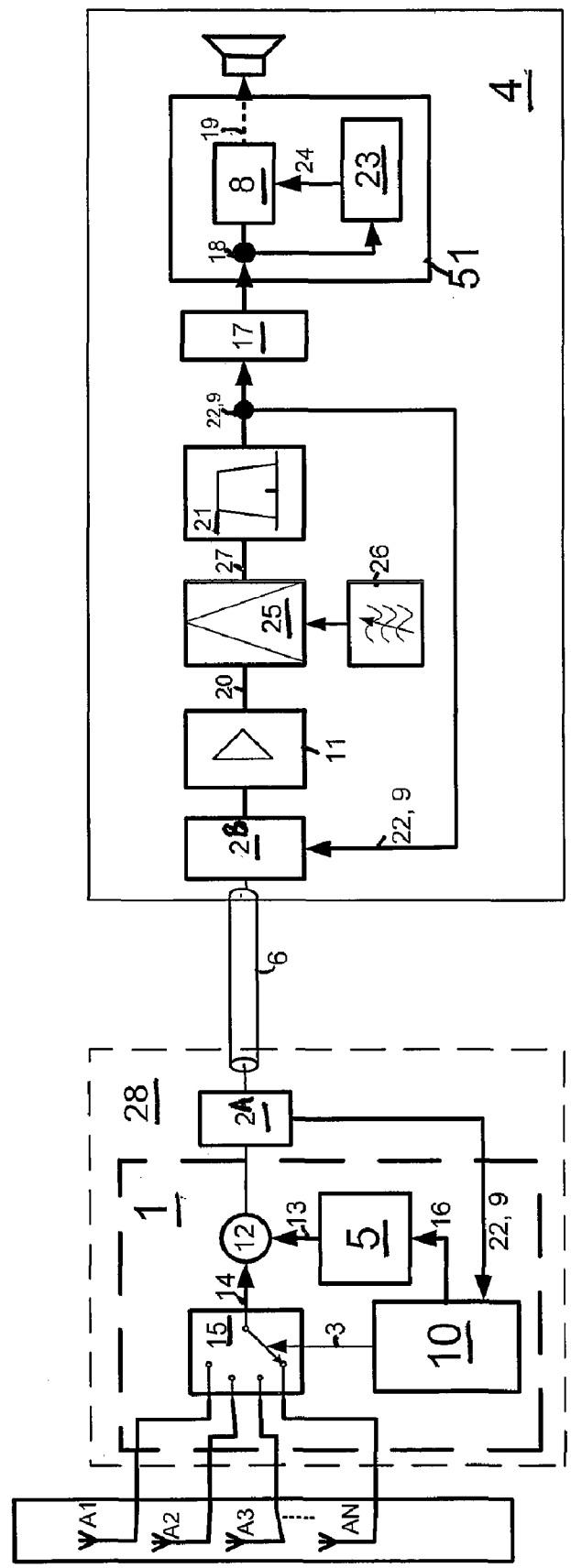
FIG. 4 shows a schematic block diagram of a reception system as shown in FIG. 3 but with a diversity unit, in which the IF signal is passed to the interference detector by way of the HF line.

FIG. 4 is a schematic block diagram of a modified version of that shown in FIG. 3. This version shows a diversity unit 28 including a diversity processor 1 and a selection device 2A and 2B. Diversity processor 1 is affixed in the vicinity of the multiple antennas A1 . . . AN in the vehicle, and is connected with receiver 4 by way of the HF line 6. In this embodiment, there are two selection devices 2a and 2b, with one selection device 2a being housed in diversity unit 28 and which is for passing IF signal 9 to interference detector 10. This selection device 2b in receiver 4 then passes IF signal 9 to selection device 2A based in diversity unit 28 so that IF signal 9 can then be passed to interference detector 10. This design, through the use of selection devices 2A and 2B links IF signal between the receiver 4 and diversity unit 28.

Another selection device 2b is housed in receiver 4 and receives IF signal 9,22 which is fed into HF line 6 in a known manner from a position between reception channel filter or IF filter 21 and FM demodulator 17.

Figure 5:
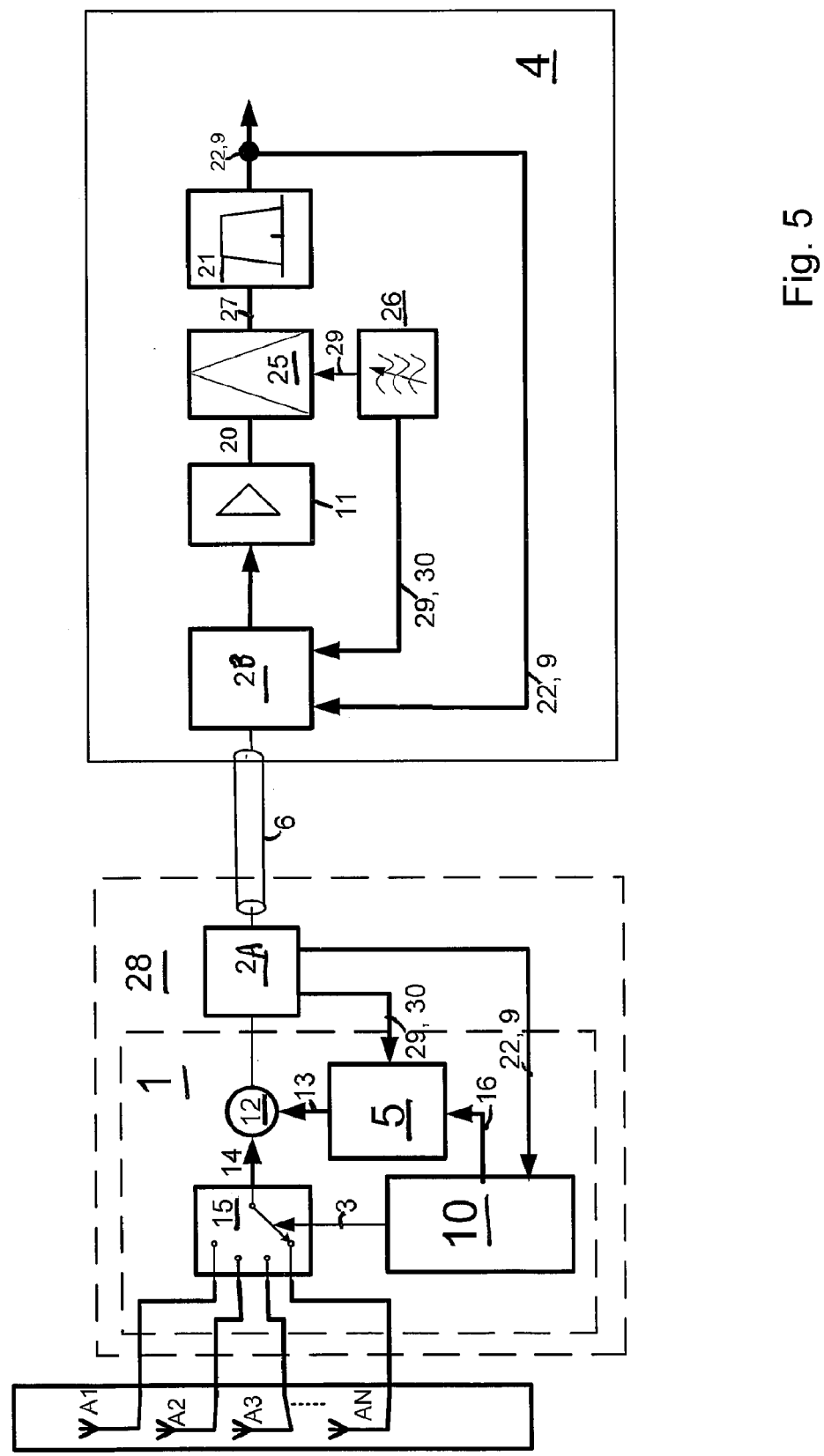
FIG. 5 shows a schematic block diagram of a reception system, similar to that shown in FIG. 4, but with additional feed of the oscillator oscillation by way of the HF line.

FIG. 5 shows a reception system, similar to that shown in FIG. 4, but with additional feed of the oscillator oscillation by way of the HF line 6. Oscillation unit 26 also has its output which is input into IF frequency converter 25 via oscillator oscillation signal 29. In addition, oscillation unit 26 has its output in the form of oscillator oscillation signal 29, and oscillator frequency information 30 input into selection device 2b.

This embodiment also includes corresponding selection devices 2a, and 2b for coupling in oscillator oscillation 29 into signature signal formation unit 5. Signature signal formation unit 5 is for conversion of the oscillator oscillation 29 into an oscillation in the HF reception channel as a signature signal 13 having a sufficient frequency distance $f_S$ from the high-frequency carrier $f_H$ to form a frequency interference deviation pulse. The remaining components of receiver 4 shown in FIG. 4 are also disposed in receiver 4 in FIG. 5 but are not shown.

Figure 6:
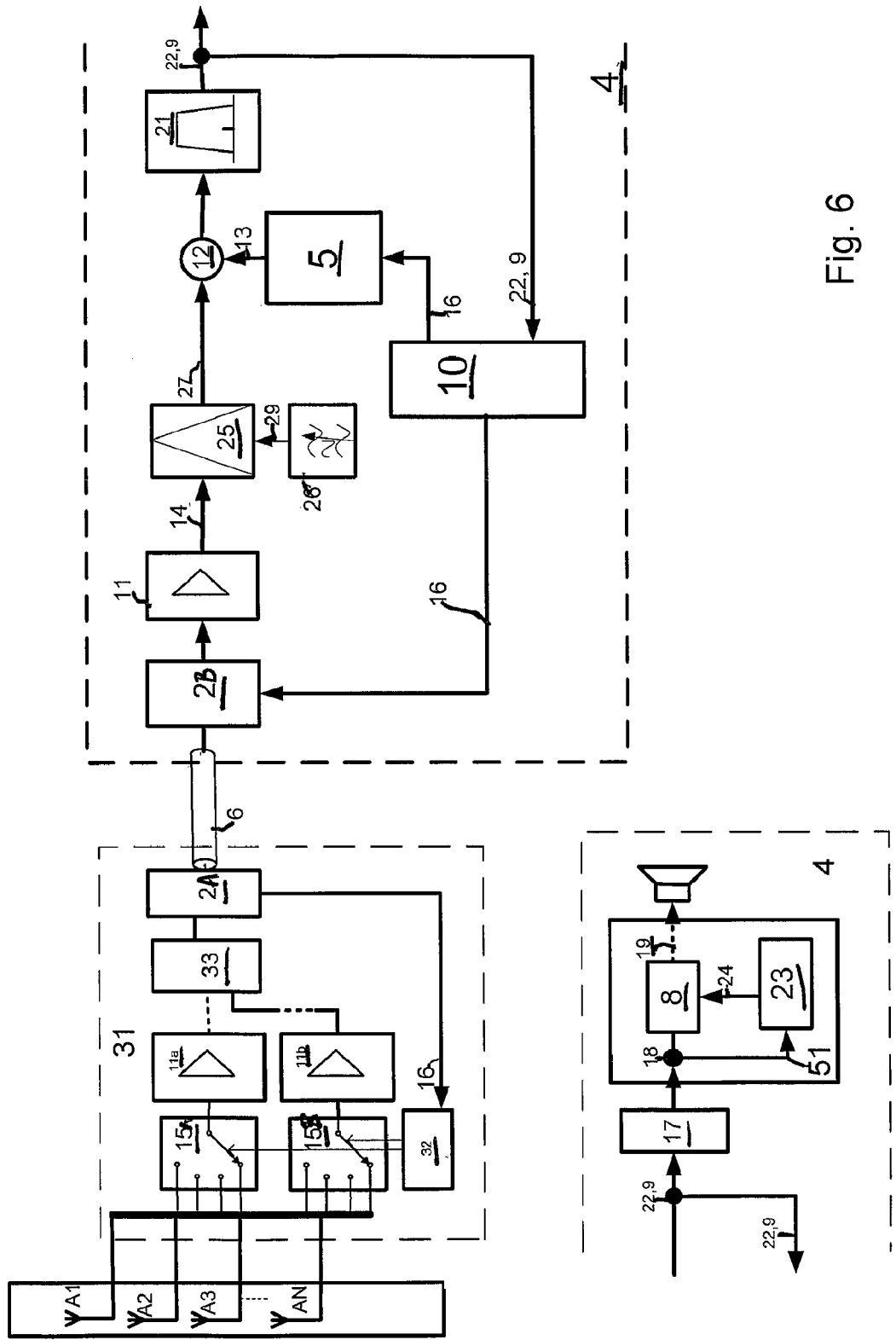
FIG. 6 shows a schematic block diagram of another embodiment of a reception system with an interference detector disposed in a receiver.

FIG. 6 shows a schematic block diagram of an antenna switching unit including a reception system with interference detector 10, signature signal formation unit 5, and signature signal switch 12 in the receiver 4. The feed of the pulse-like signature signal 13 into the IF signal path of the reception signals takes place by way of the signature signal switch 12 ahead of the IF filter 21. The switching signal pulses 16 are passed to the switching logic 32 in the antenna switching unit 31 by way of selection devices 2 by way of the HF line 6, to form alternative reception signals using the antenna signal change-over switch 15. This embodiment also includes a signal combiner 33 disposed in antenna switching unit 31 for combining signals output from the two HF amplifiers 11a and 11b. Each of these HF amplifiers 11a and 11b has its input coupled to the output of an associated antenna signal change over switch 15a and 15b. Each of these antenna signal change over switches 15a and 15b are controlled by a switching logic 32 which receives a switching signal pulse 16 from selection device 2a. Thus, selection device 2a controls the two antenna signal change over switches 15a and 15b to control the switching between antenna signals from antennas A1, A2, A3, ...An.

The other selection device 2b is for receiving signals in the form of switching signal pulses 16 as well from interference detector 10 which is housed in receiver 4. These same switching signal pulses 16 are fed from interference detector 10 into signature signal formation 5 and then transformed into signature signal 13 which is then fed into switch/coupling element 12 to create a pulse that is synchronized with the timing of the switching period for switching from one antenna to another to reduce distortion and interference.

Thus, the design of FIGS. 2-6 relate to a diversity system which produces high quality audio reception via the controlled switching of interference detector 10 and the superimposition of a muting pulse on a reception signal 14 to mask or mute any interference or distortion associated with the switching from one antenna to another in a diversity system. With this design, this superimposition occurs in the receiver, before HF amplifier 11, before IF frequency converter 25 and before reception channel filter/IF filter 21. Thus, interference detector 10 has at least two functions. One function is that it receives a reception channel signal 22 or IF signal 9, and passes a switching signal pulse 16 if it determines that the antennas should be switched. In addition, another function is that interference detector 10 also passes this same switching signal pulse 16 which is then transformed by signature signal formation element 5 for forming a signature signal 13. This signature signal 13 is coupled with reception signal 14 to form a marked reception signal 20 that is for suppressing or masking the distortion, interference or otherwise relatively poor audio quality associated with the reception during the time of switching.

A particularly effective method according to the invention, for triggering the interference masking in the interference masking unit 51, is based on the configuration of the signature signal 13 as a signature signal carrier 38 (See FIGS. 7A, 7B and 8) in the form of a sine-shaped oscillation having a sufficiently great frequency distance $f_S$ from the current frequency of the HF carrier oscillation $f_H$ of the reception channel. This signal can be implemented, as in FIG. 7B, for the example of a reception frequency set in fixed manner, by means of a fixed-frequency signal generator 35 having the frequency $f_H\text{-}f_S$, situated in the signature signal formation 5. To mark the time point before the change-over of the antenna signal, signature signal carrier 38 is superimposed onto reception signal 14 in signature signal switch 12, by way of a switch 36 controlled by means of the switching signal pulses 16, in pulse-like manner and dominantly in terms of size, and thus forms signature signal carrier 38.

When this signal occurs, a frequency interference deviation pulse that corresponds to the frequency distance $f_S$ occurs in the reception channel, and this pulse brings about a pulse for triggering the interference masking at the output of FM demodulator 17 in receiver 4. The greater the frequency distance $f_S$ from the current frequency of the HF carrier oscillation $f_H$ of the reception channel is selected to be, the greater the frequency interference deviation pulse, and the pulse for triggering the frequency masking that is in effect at the output of FM demodulator 17.

FIG. 7A shows the spectrum of the reception signal within the reception channel, with a signature signal carrier 38 placed in the vicinity of the lower end of the channel, as an example.

FIG. 7B is a schematic block diagram of a signature signal formation with signature signal generator 35 having the inherent frequency $f_S$ for pulse-like additive feed of the signature signal 13 into the signature signal switch/coupling element 12 by way of the switch 36 controlled by switching signal pulses 16 and pulse former 34. The marked reception signal 20 is present at the output of the signature signal switch 12.

FIG. 7C shows—for illustration—the time progression (x axis) of the frequency deviation (y axis) from the carrier frequency $f_H$ of a high-frequency carrier modulated with a low-frequency signal of $f_N$=1 kHz. There is also a frequency interference deviation pulse for marking the change-over moment at the time point $t_S$, in accordance with the frequency distance $f_S$. The pulse duration $t_i$ can be selected to be correspondingly small, in accordance with the size of the frequency distance $f_S$, for reliable triggering of the interference masking. Accordingly, a frequency distance $f_S$ in the vicinity of half the channel width is particularly effective. With ultra-short-wave radio, a frequency distance $f_S$ on the order of 40 to 100 kHz is therefore advantageous. It is obvious that the triggering of interference masking according to the invention can be achieved, in analogous manner, also with a high fixed-frequency signal generator 35 having the frequency $f_H\text{+}f_S$.

FIG. 5 shows a tunable receiver in terms of frequency. With this design, there is oscillator oscillation 29 of the oscillator frequency $f_O$ of oscillator 26 in receiver 4 that corresponds to the reception frequency that has been set, and which is transmitted to the diversity unit 28 to produce a corresponding signature signal 13 in the form of a signature signal carrier 38. This takes place by way of selection devices 2 and the HF line 6 to the signature signal formation unit 5 in the diversity unit 28.

With respect to signature signal formation unit 5, and signature signal switch 12, FIG. 8 shows this in greater detail which shows a signal generator 35 and a frequency mixer 37, to which the oscillator oscillation 29 and the output signal of signal generator 35 are passed. The frequency of the signal generator 35 is set in fixed manner, based on the knowledge of the intermediate frequency and the desired frequency departure $f_S$ from the HF carrier of the current reception signal.

In this connection, the following condition for the frequency $f_{Gen}$ of the signal generator 35 applies for generating a signature signal carrier 38 having the frequency $f_H\text{-}f_S$, which lies below the high-frequency carrier $f_H$ of the reception channel:

$$f_{Gen}=f_{ZF}+f_S \qquad (1)$$

Accordingly, the following applies for generating a signature signal carrier 38 having the frequency $f_H\text{+}f_S$ that lies above the high-frequency carrier $f_H$ of the reception channel, in terms of frequency:

$$f_{Gen}=f_{ZF}-f_S \qquad (2)$$

Both equations apply for receivers 4 having an oscillator frequency $f_O$ that lies high in terms of frequency. In the case of an oscillator 26 that lies low in terms of frequency, the sum and difference signs in Equations (1) and (2) are interchanged accordingly.

In an alternative variant of the invention, an oscillator frequency information 30 that is preferably configured digitally is transmitted in place of the oscillator oscillation 29, which information can generally be derived from the digital frequency information of the receiver-side oscillator 26, and serves to set the oscillation frequency of an oscillator situated in the signature signal formation 5.

In another embodiment as shown in FIG. 9A, a tunable oscillator 39 is present in the signature signal formation unit 5, which oscillator is tuned by a ramp function transducer 40 for generating a frequency increase. The ramp function transducer 40 is configured so that it changes the oscillation frequency of the tunable oscillator 39 in a few microseconds, proceeding from the lowest frequency of the radio frequency band $f_u$. This occurs in the ultra-short-wave frequency band, for example, towards an increasing frequency. This process is triggered by a switching signal pulse 16, in each instance.

The starting signal of tunable oscillator 39 forms signature signal 13, which is additively superimposed on reception signal 14 in signature signal switch/coupling element 12, with a powerful amplitude. In this way, a powerful negative frequency jump occurs at the output of the IF filter 21 when the band limit of the reception channel is reached, on the order of half the channel bandwidth, in the reception signal of the receiver 4, and a marked pulse occurs at the output of the FM demodulator 17. Using the differentiation circuit 42 situated in the interference masking unit 51 and shown in FIG. 10, a pulse is derived from this, which initiates interference masking in interference suppression circuit 8, as an interference masking signal 24.

To improve the response reliability, it can be advantageous to have a pulse former 34 (see FIG. 10) for turning on the interference suppression circuit 8 follow the differentiation circuit 42 in signature signal evaluation 23. FIG. 9B is a graph which explains this effect wherein the reception channel is shown spectrally, with its band limits. Essentially the signature signal 13 is shown at different time points $t_0$, $t_1$, $t_s$, while passing through the ramp function with a frequency jump being brought about at the output of the FM demodulator 17 in receiver 4 when the band limit of the reception channel is reached at the frequency $F_H$-$F_S$.

In this case, the spectral line of the oscillator oscillation—starting with the time point $t_0$ at the lowest frequency of the radio frequency band $f_u$—is shown changing towards an increasing frequency. When the pass-through range of the IF filter 21 is reached, approximately at the time point $t_s$, its frequency jump is triggered, which initiates the interference masking described. It is obvious that the oscillation frequency of the tunable oscillator 39 can be changed analogously, from the highest frequency of the radio frequency band $f_o$, towards a decreasing frequency, if the ramp function transducer 40 is configured accordingly. This is to generate a powerful positive frequency jump on the order of half the channel bandwidth in the IF reception signal 9 when the upper band limit of the reception channel is reached.

Figure 10:
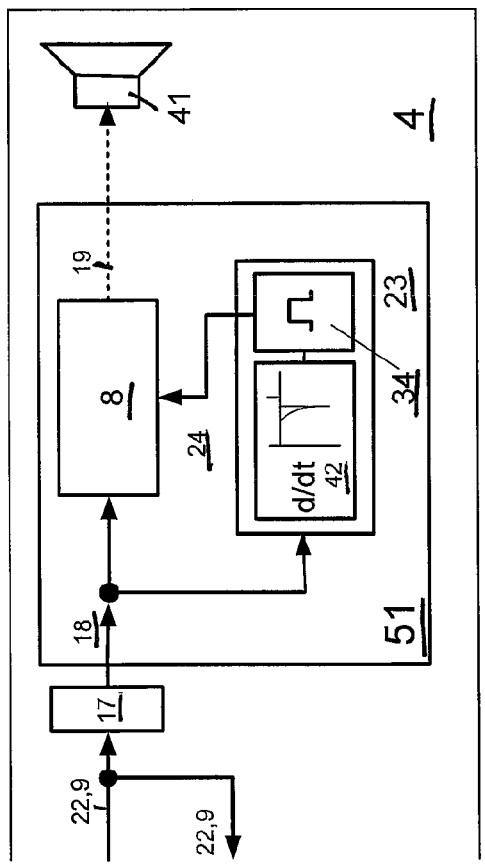
FIG. 10 is a schematic block diagram of a receiver having a pulse transformer.

FIG. 10 shows another embodiment of receiver 4. This view shows a schematic block diagram of interference masking unit 51 with differentiation circuit 42 and pulse former 34 in the signature signal evaluation unit 23. Evaluation unit 23 has its output coupled to interference suppression circuit 8 and is for determining the base band signature signal 18 after the FM demodulator 17 and forming the interference masking signal 24 for turning on the interference suppression circuit 8.

Figure 11:
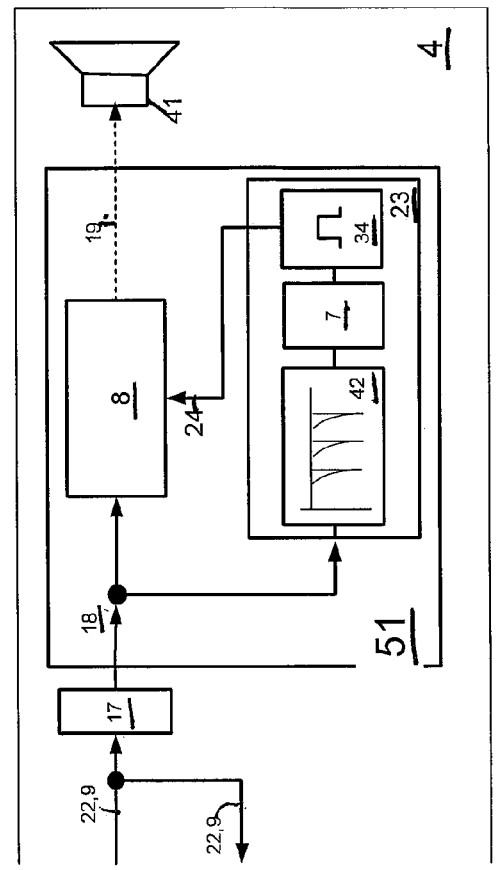
FIG. 11 is a schematic block diagram of a modified embodiment from that shown in FIG. 10.

FIG. 11 shows another embodiment. To further increase the response reliability of the interference masking, a pulse series with a predetermined pulse frequency can be generated. FIG. 11 shows an interference masking unit 51 wherein there is a frequency-selective pulse evaluation 7 and a pulse former 34 for configuring the interference masking signal 24. In this connection, the pulse series is generated by a suitable device in the signature signal formation 5 (See FIG. 8) and triggered by a switching signal pulse 16, in each instance. This method can be used analogous to this, by means of multiple triggering of the ramp function transducer 40 mentioned above, to generate a pulse series of the frequency jump that results from this and was described above. Thus, FIG. 11 shows a block diagram including an interference masking unit 51 as in FIG. 10, but for a base band signature signal 18 configured by a pulse chain, with a fixed-frequency resonator 7 tuned to the subsequent pulse frequency, for accurate derivation of an interference masking signal 24.

Figure 12:
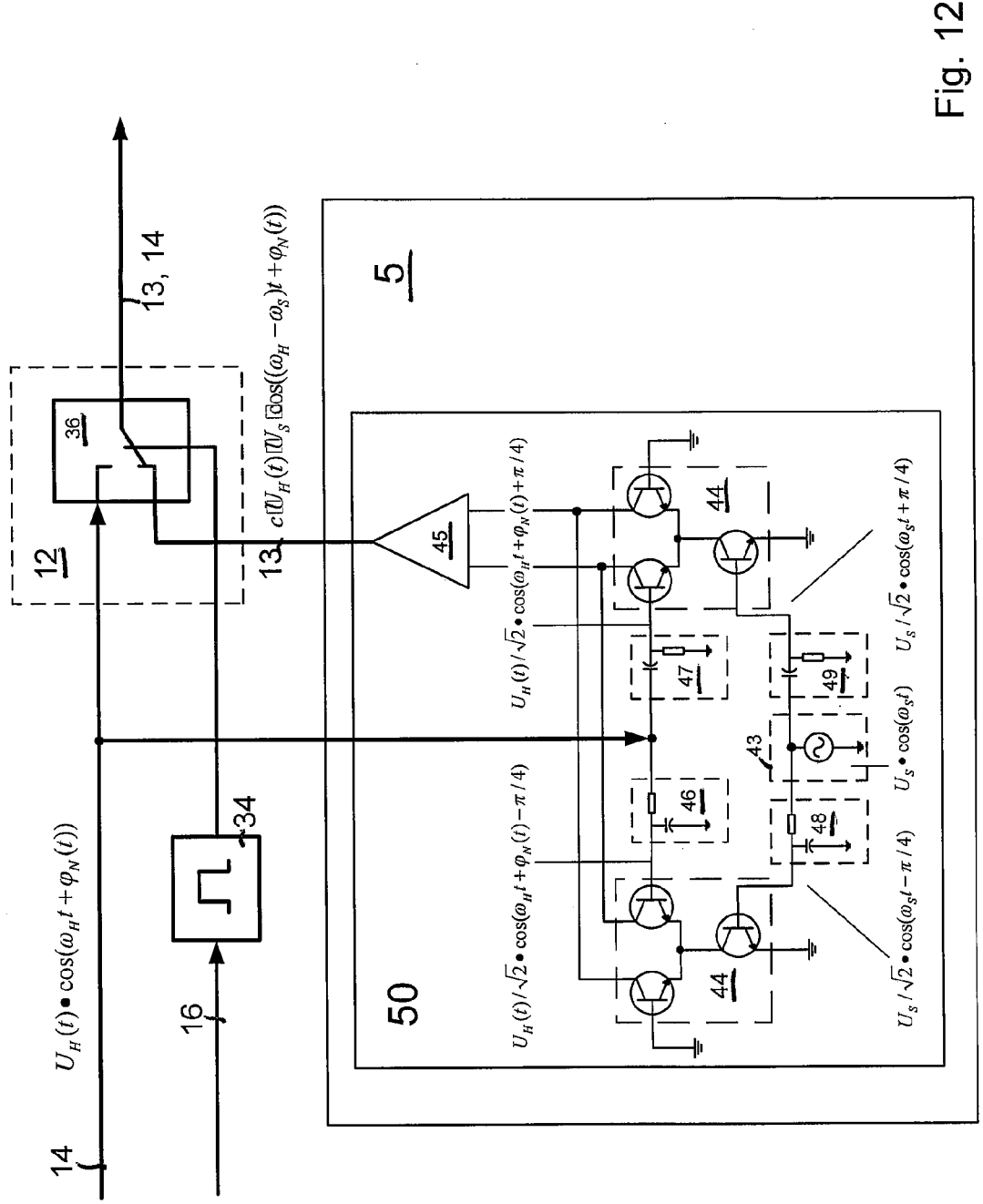
FIG. 12 shows a schematic block diagram of a nature signal formation with frequency converter and a fixed-frequency oscillator.

FIG. 12 shows another embodiment of the invention, in which case, the frequency of the incoming reception signal 14, which is modulated in frequency, is shifted suddenly, over the time of the pulse width $t_i$, by the frequency deviation $f_S$, to generate a frequency interference deviation pulse. In contrast to the method shown in FIGS. 7A, 7B and 7C, and explained in this connection, here the signature signal 13 is directly obtained from the reception signal 14 by means of a frequency shift. The frequency shift during the frequency deviation pulse by the frequency $f_S$ is shown in relation to the frequency position of the channel filter in FIG. 13A.

Figure 13B:
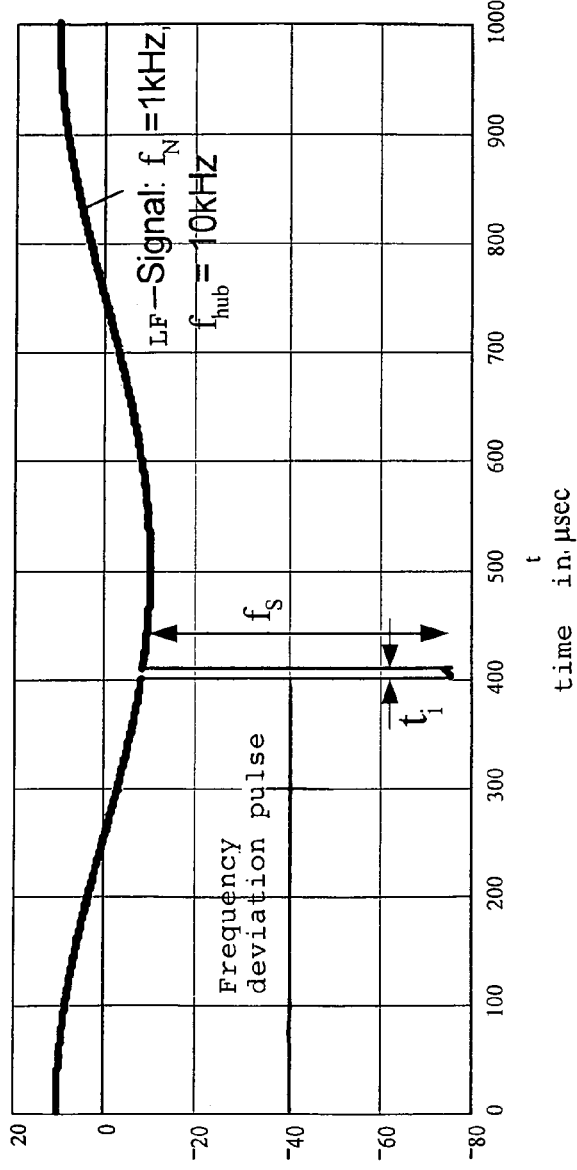
FIG. 13B shows a graph of a frequency deviation of the high-frequency carrier in the reception signal in the case of frequency modulation with an $f_N$=1 kHz audio signal.
Figure 13A:
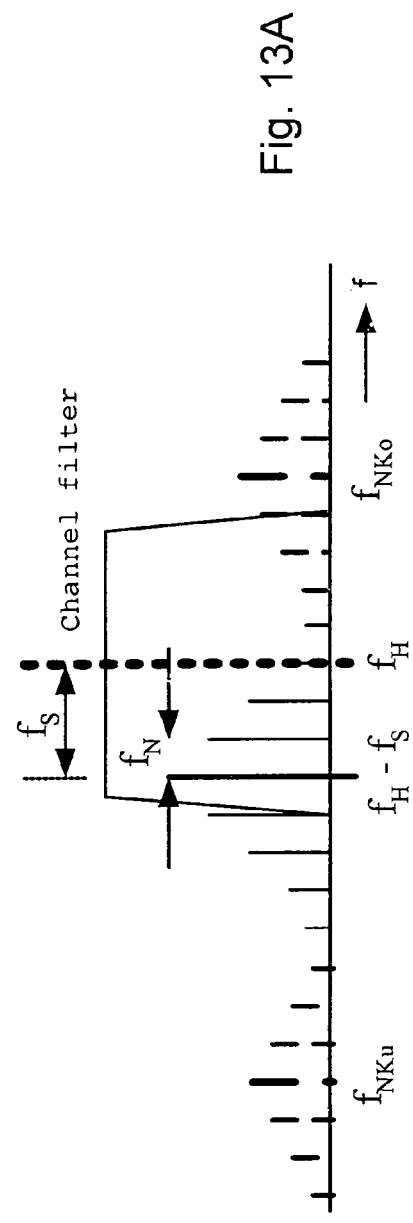
FIG. 13A shows a graph of a spectrum of the reception signals offset by the fixed frequency $f_S$ in relation to the frequency position of the reception channel filter.

For example, FIG. 13A shows a graph of a spectrum of the reception signals 14 offset by the fixed frequency $f_S$ in relation to the frequency position of the reception channel filter 21 configured in the high-frequency range. Spectral lines ($f_H$-$f_S$, . . . ) assigned to the reception channel are shown with solid lines, and the adjacent channel signals ($f_{NKu}$-$f_S$, $f_{NKo}$-$f_S$, . . . ) are shown with broken lines.

FIG. 13B shows a frequency deviation of the high-frequency carrier in the reception signal 14 in the case of frequency modulation with an $f_N$=1 kHz audio signal, and pulse-like deviation from the momentary frequency of the reception signal 14 in the reception channel at the moment of the occurrence of the signature signal 13, over the pulse duration $t_i$.

FIG. 13B shows—for an explanation—the time progression of the frequency deviation from the carrier frequency $f_H$ of a high-frequency carrier modulated with a low-frequency signal of $f_N$=1 kHz, with a frequency interference deviation pulse for marking the change-over moment at the time point $t_S$, corresponding to the frequency distance $f_S$.

Here again, the pulse duration $t_i$ can be selected to be correspondingly small, for reliable triggering of the interference masking in accordance with the size of the frequency distance $f_S$. Accordingly, a frequency distance $f_S$ in the vicinity of half the channel bandwidth is particularly effective here, too, and in the case of ultra-short-wave radio, a frequency distance $f_S$ on the order of 40 to 70 kHz is advantageous here, too. It is obvious that the triggering of interference masking according to the invention can take place analogously with a positive frequency interference deviation pulse for marking the change-over moment at the time point $t_S$, corresponding to the frequency distance $f_S$.

FIG. 12 shows a schematic block diagram of a nature signal formation 5 with frequency converter 50 and fixed-frequency oscillator 43 having the inherent frequency $f_S$ for forming the signature signal 13 by means of offsetting the reception signal 14 by the frequency departure $f_S$ using two symmetrical mixers 44 differently controlled in phase by 90 degrees. The feed of this signal into the signal path of the reception signals 14, by way of the switch 36, takes place in pulse-like manner, by means of a switch 36 controlled by the switching signal pulse 16.

FIG. 12 shows that the pulse-like frequency shift of the reception signal 14 can take place using the frequency converter 50 in the signature signal formation 5.

This becomes evident from the following discussion:

If $\phi_N(t)$ is the momentary phase deviation of the high-frequency carrier on the basis of the low-frequency modulation, and $U_K(t)$ is the current amplitude of the high-frequency oscillation on the basis of the propagation conditions, then the high-frequency reception signal 14 can be described with the carrier frequency $f_H$, as follows:

$$U_H(t) \cdot \cos(\omega_H t + \phi_N(t)) \quad (3)$$

The momentary frequency deviation from the carrier frequency $f_H$ is given in Equation (3) on the basis of the low-frequency modulation, by $$\frac{1}{2\pi} * \frac{d\varphi_N(t)}{dt},$$

so that the momentary frequency is:

$$f_n + \frac{1}{2\pi} * \frac{d\varphi_N(t)}{dt} \quad (4)$$

In FIG. 12, this signal is passed both to a −45° HF phase rotation element 46 and to a +45° HF phase rotation element 47, the output signal of which turns on a first input of a symmetrical mixer 44, in each instance. For this example, the signal that trails by the phase angle π/4 at the first input of the one symmetrical mixer 44 is $$U_H(t)/\sqrt{2} \cdot \cos(\omega_H t + \phi_N(t) - \pi/4) \quad (5)$$

and the signal that leads by the phase angle π/4 at the first input of the other symmetrical mixer 44 is $$U_H(t)/\sqrt{2} \cdot \cos(\omega_H t + \phi_N(t) + \pi/4) \quad (6)$$

so that the two symmetrical mixers 44 are turned on with signals shifted in phase by π/2. The π/4 phase rotation elements can be structured, for example, in simple manner as an RC element for the −45° HF phase rotation element 46 and as a CR element for the +45° HF phase rotation element 47, respectively, which are dimensioned for the center frequency of the ultra-short-wave radio band, for example. In order to bring about the phase shift, a fixed-frequency oscillator 43 is present in the frequency converter 50, the oscillation frequency of which oscillator is equal to the frequency $f_S$, by which the reception signal 14 is to be offset. In analogous manner, the output signal of the fixed-frequency oscillator 43 is passed to the two inputs of the symmetrical mixer 44, offset by π/2 in phase relative to one another. This is done in simple manner, again using π/4 phase rotation elements that can be structured for this frequency, whereby the one can be represented as an RC element for the −45° LF phase rotation element 48 and the other as a CR element for the +45° LF phase rotation element 49. Therefore the signal that trails by the phase angle π/4 at the second input of the one symmetrical mixer 44 is $$U_S/\sqrt{2} \cdot \cos(\omega_S t - \pi/4) \quad (7)$$

and the signal that leads by the phase angle π/4 at the second input of the other symmetrical mixer 44 is $$U_S/\sqrt{2} \cdot \cos(\omega_S t + \pi/4) \quad (8)$$

The output signals of the two symmetrical mixers 44, which are brought together accordingly, are passed to an amplifier 45 in FIG. 12, with the amplification degree of which the constant c can be adjusted in its output signal, so that the latter is as follows:

$$c[U_H(t)][U_S[\cos((\omega_H - \omega_S)t + \phi_N(t))] \quad (9)$$

This signal forms the signature signal 13, which is fed into the signal path of the reception signals 14 in pulse-like manner, using the switch 36 controlled by the switching signal pulse 16. It is evident from Equation 9 that the momentary frequency of the signature signal 13 deviates in pulse-like manner from the momentary frequency of the reception signal 14 that occurs at the moment of the pulse, by the inherent frequency $f_S$ of the fixed-frequency oscillator 43, so that it is:

$$f_H - f_S + \frac{1}{2\pi} * \frac{d\varphi_N(t)}{dt} \quad (10)$$

By interchanging the two phase rotation elements for turning on the first or the second input of the symmetrical mixer 44, a frequency shift in the positive direction can be implemented, so that in place of Equation (10), the following momentary frequency is obtained:

$$f_H + f_S + \frac{1}{2\pi} * \frac{d\varphi_N(t)}{dt} \quad (11)$$

The particular advantage that the amplitude of this signal is directly proportional to the amplitude of the reception signal 14, independent of time, is connected with this method for generating a signature signal 13. If the amplification of the amplifier 45 is suitably set in connection with the amplitude of the signal of the fixed-frequency oscillator 43, it can be brought about, with $c \cdot U_S = 1$, that when the signature signal 13 occurs, no amplitude jump takes place. In this way, particularly great reliability of the response of the interference masking unit 51 to the signature signal 13 is achieved, independent of the level of the reception signal 14.

In another embodiment of the invention, in FIG. 6, the interference detector 10, the signature signal formation 5, and the signature signal switch 12 are accommodated in the receiver 4, whereby the switch is introduced in the intermediate-frequency plane 27 ahead of the IF filter 21.

In this connection, it is presupposed that—as usual—the signal running time in the high-frequency transmission elements and in the IF frequency converter 25 between the antenna signal change-over switch 15 and the signature signal switch 12 can be ignored, in the sense of the running times to be considered here. A signal generator 35 is present in the signature signal formation 5, for generating a signature signal 13 in the form of a signature signal carrier 38 having a fixed frequency. The frequency of the signal generator 35 deviates from the intermediate-frequency carrier $f_Z$ by the desired frequency departure $f_S$. This oscillation is additively superimposed on the reception signal in the intermediate-frequency plane 27, in pulse-like manner, initiated by switching signal pulses 16, by way of the switch 36 in the signature signal switch 12.

Figure 14:
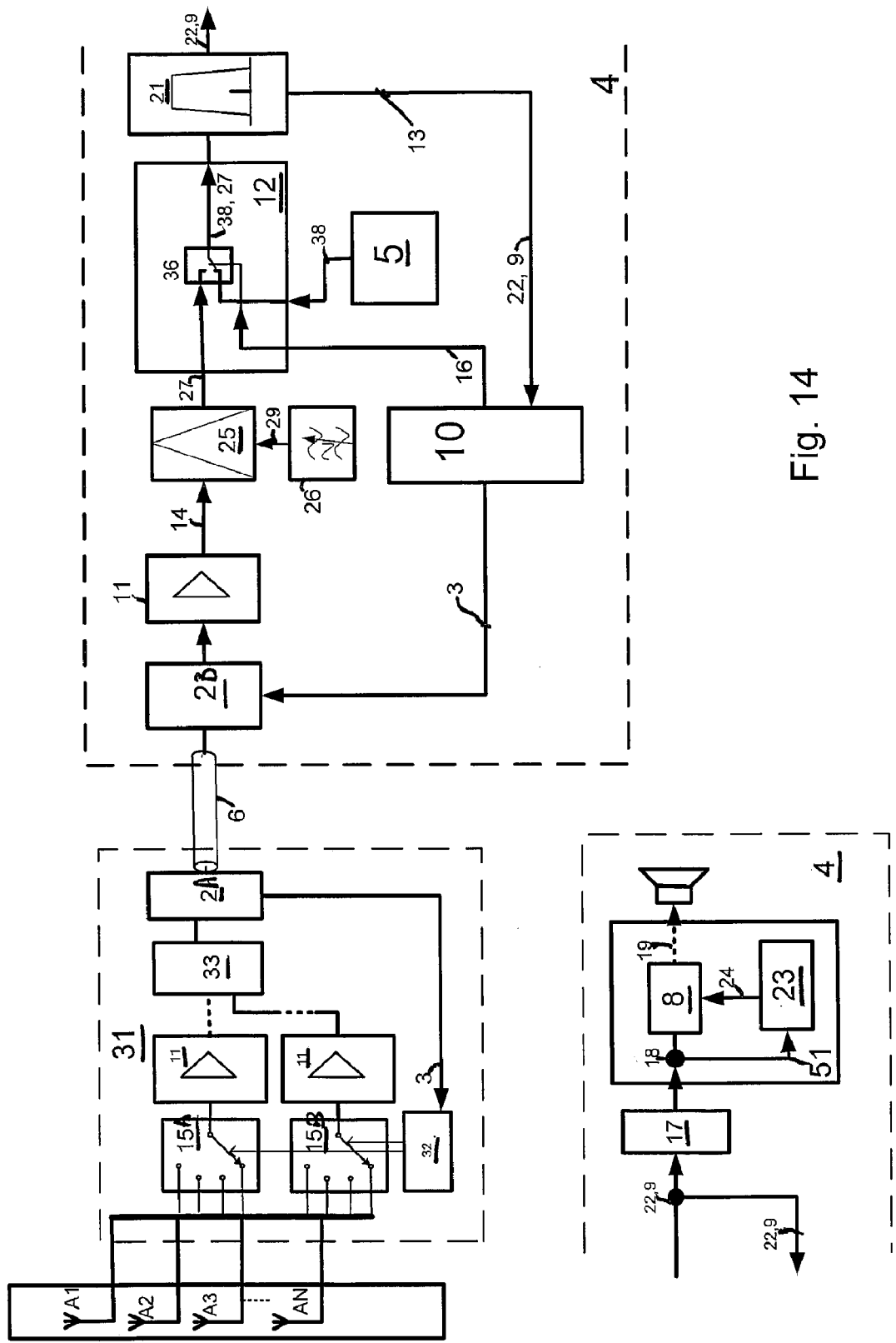
FIG. 14 is a modified schematic block diagram of a reception system as in FIG. 6, and further comprising a switch.

FIG. 14 shows a schematic block diagram of a reception system as in FIG. 6, but in place of the additive superimposition of the signature signal 13 in the signature signal switch 12, the feed of the signature signal 13 into the signal path of the reception signals 14 takes place, as in FIG. 13, by way of a switch 36 controlled by the switching signal pulse 16.

In this case, switch 36 is disposed in receiver 4, and controlled by the switching signal pulse 16 which is present in the signature signal formation 5. By means of this switch, the signature signal 13 is fed into the signal path of the reception signals 14 by means of a short-term change-over, in pulse-like manner, so that the momentary frequency of the reception signal in the intermediate-frequency plane 27 deviates from the inherent frequency $f_S$ of the fixed-frequency oscillator 43, in pulse-like manner. To show the general applicability of the present invention, in FIG. 6, a complex antenna switching unit 31 is shown, having two antenna signal change-over switches 15 and two HF signal branches 11a, 11b, having a signal combiner 33 for phased combining of antenna signals, and a switching logic 32 for targeted setting of the antenna switching unit 31.

Figure 15:
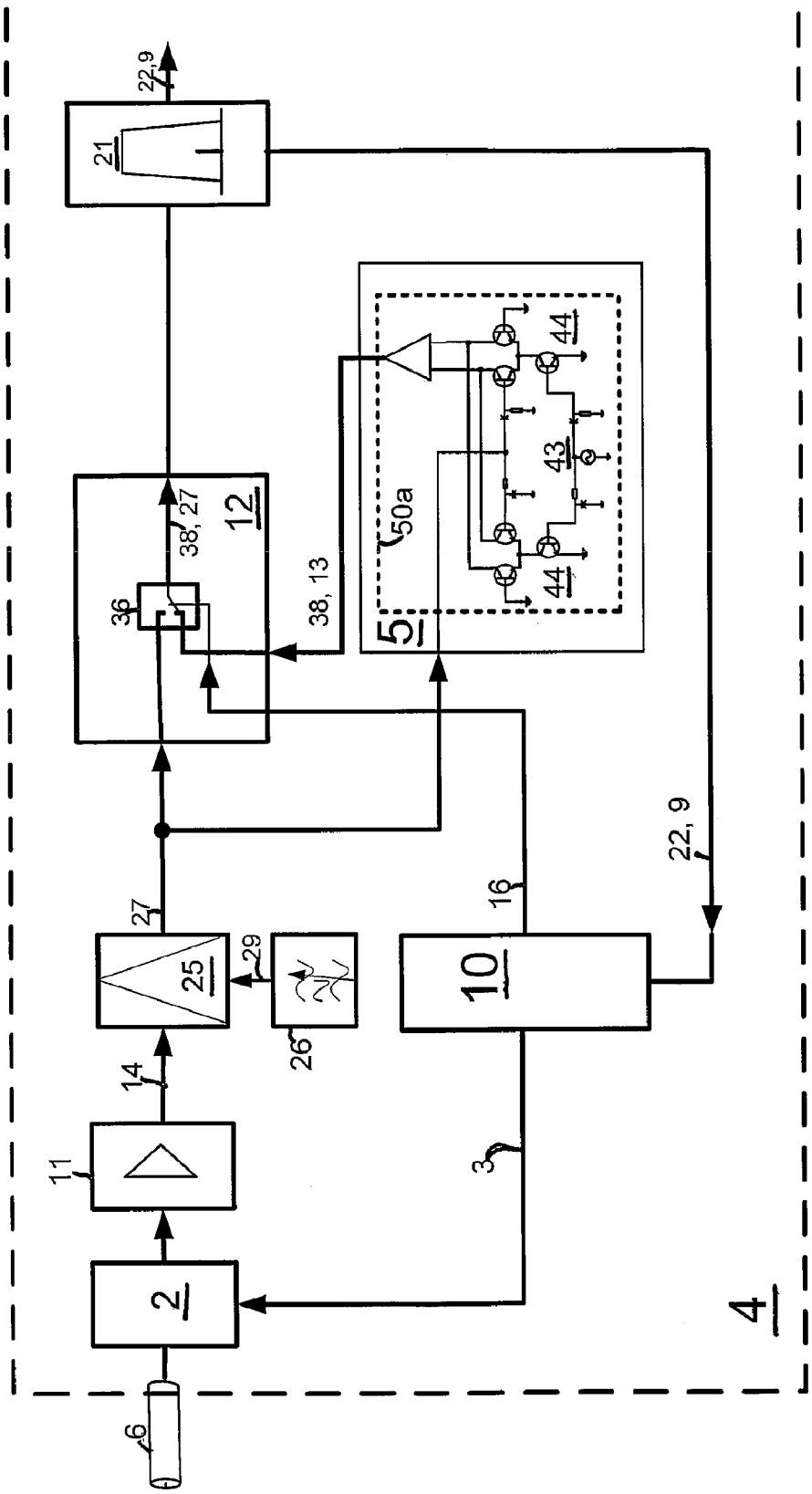
FIG. 15 is a schematic block diagram of a reception system as in FIGS. 6 and 14 wherein the signature signal is formed by an IF frequency converter.

FIG. 15 shows a schematic block diagram of a reception system as in FIGS. 6 and 14, whereby the signature signal 13, however, similar to FIG. 12, is formed by means of an IF frequency converter 25 with fixed-frequency oscillator 43 having the inherent frequency $f_S$, by means of offsetting the reception signal 27 in the intermediate-frequency plane by the frequency departure $f_S$, to form a frequency deviation pulse. In this embodiment signature signal 13 is derived from the reception signal in intermediate-frequency plane 27, in similar manner as described above, by means of frequency conversion of high-frequency reception signals 14, with positioning of interference detector 10 in receiver 4 in the intermediate-frequency plane. In this case, the reception signal in intermediate-frequency plane 27 is passed to signature signal formation 5 after the IF frequency converter 25, as shown in FIG. 15. In the signature signal formation 5, there is a frequency converter 50a, which shifts the intermediate frequency in similar manner as was derived above for the frequency converter 50, by the frequency of the fixed-frequency oscillator 43. The 45-degree phase rotation elements 46 and 47 for turning on the first input of the two symmetrical mixers must accordingly be structured for the intermediate frequency $f_Z$.

Figure 16:
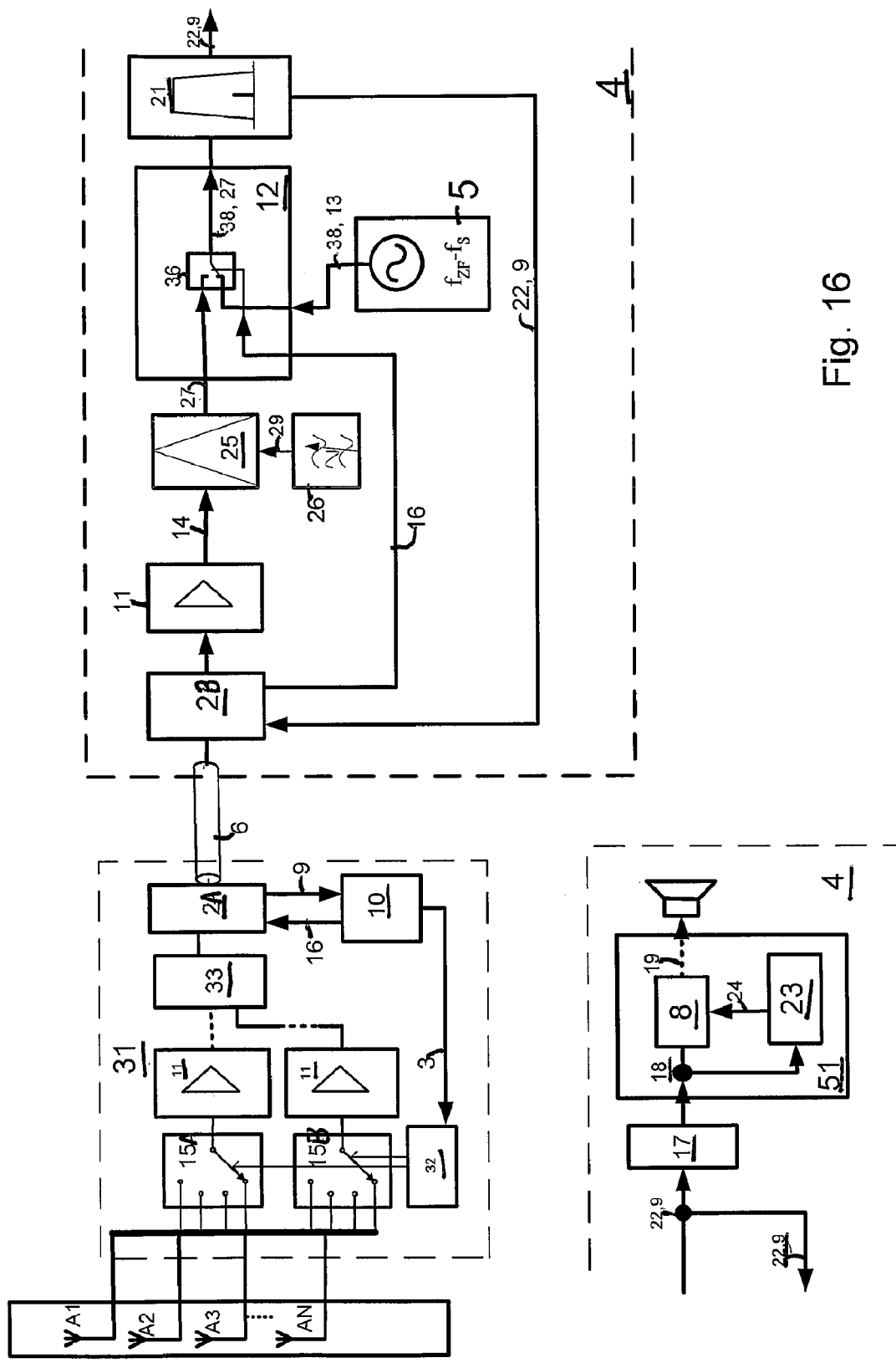
FIG. 16 is a schematic block diagram of a reception system similar to FIG. 14, but with the interference detector 10 in the antenna switching unit.

FIG. 16 is a schematic block diagram of a reception system similar to FIG. 14, but with the interference detector 10 in the antenna switching unit 31. Interference detector has switching signal pulses 16 that are passed to the controlled switch 36 in the signature signal switch 12 by way of selection devices 2 and the HF line 6, and signature signal 13 is formed as an oscillation of a fixed-frequency oscillator 43 having a frequency that deviates from the IF center frequency $f_{ZF}$ by the frequency $f_S$. This embodiment which shows signature signal formation element 5 and signature signal switch 12 are accommodated in receiver 4, however, interference detector 10 is situated in diversity unit 28 or in antenna switching unit 31. In this connection, switching signal pulses 16 given off by interference detector 10 are passed to receiver 4 by way of selection devices 2 and HF line 6. Switching signal pulses 16 are also passed to the switch 36 in the signature signal switch 12. When switching signal pulse 16 occurs in antenna switching unit 31, signature signal 13 is fed into the channel of the reception signals for the pulse duration, by changing over switch 36, thereby initiating interference masking.

In another embodiment of the invention, signature signal switch 12 is structured as a signal blending-in device 52 for constant superimposition of signature signal 13. In place of the abrupt additive, i.e. switched feed of signature signal 13, this results in the possibility of separately adjusting the rise time, the pulse peak value, and the pulse duration of the frequency interference deviation pulse. This characteristic can be of particular importance in those cases, in particular, where an interference suppression circuit 8 is unchangeably present in an FM radio receiver 4. To reliably initiate interference masking by means of a frequency interference deviation pulse in such a case, it can be necessary to set a specific combination of rise time, pulse peak value, and pulse duration.

In a further development of the invention that is advantageous in terms of the ability to implement it with economic efficiency, a noise generator 53 for generating a noise signal as the signature signal 13 is used in a reception system for FM radio reception according to the superimposition principle, with frequency converter 25, oscillator 26, and FM demodulator 17, in place of the devices for generating the signature signal 13 of the embodiments of the invention described in FIGS. 3, 4, 7b, 11, 6, 16, and in connection with them. Signature signal 13, which is structured in pulse-like manner, is fed into the signal path of the reception signals 14, in the signature signal switch 12, for time-marking the change-over process that takes place immediately thereafter. The pulse-like nature of the signature signal 13 is brought about, for example, by means of pulse-like activation of the noise generator, or by means of pulse-like superimposition of the noise level and of the reception signal. To produce a sufficiently great frequency jump and thus a sufficiently great pulse at the output of the FM demodulator 17 at the moment of the occurrence of the signature signal 13 formed in this manner, the noise signal must be superimposed onto the reception signal at a sufficiently high level, according to the invention. According to the invention, the frequency spectrum of the noise signal must be selected in such a manner that it at least covers the reception frequency range of FM radio. In this manner, initiation of interference suppression is brought about in the interference suppression circuit 8, in place of the signature signal 13.

Accordingly, while a few embodiments of the present invention have been shown and described, it is to be understood that many changes and modifications may be made thereunto without departing from the spirit and scope of the invention as defined in the appended claims.

LIST OF REFERENCE SYMBOLS

Diversity processor 1
Selection device 2
Antenna change-over signal 3
Receiver 4
Signature signal formation 5
HF line 6
Frequency-selective pulse evaluation 7
Interference suppression circuit 8
IF signal 9
Interference detector 10
HF amplifier 11
HF signal branch 11a, 11b
Signature signal switch 12
Signature signal 13
Reception signal 14
Antenna signal change-over switch 15
Switching signal pulses 16
Demodulator, FM demodulator, base band processor 17
Base band signature signal, audio signal 18
Base band signal after interference suppression 19
Marked reception signal, HF signal 20
Reception channel filter, IF filter 21
Reception channel signal 22
Signature signal evaluation 23

Interference masking signal 24
IF frequency converter 25
Oscillator 26
Reception signals in the intermediate-frequency plane 27
Diversity unit 28
Oscillator oscillation 29
Oscillator frequency information 30
Antenna switching unit 31
Switching logic 32
Signal combiner 33
Pulse former 34
Fixed-frequency signal generator 35
Switch 36
Mixer 37
Signature signal carrier 38
Tunable oscillator 39
Ramp function transducer 40
Audio part 41
Differentiation circuit 42
Fixed-frequency oscillator 43
Symmetrical mixer 44
Amplifier 45
−45° HF phase rotation element 46
+45° HF phase rotation element 47
−45° LF phase rotation element 48
+45° LF phase rotation element 49
Frequency converter 50, 50a
Interference masking unit 51
Signal blending-in device 52
Noise generator 53
Multiple antennas A1 ... AN
$f_H$ high-frequency carrier of the reception channel
$f_S$ frequency departure from the HF carrier, i.e. from the current frequency of the reception signal
$f_Z$ IF carrier frequency carrier of the reception channel
$f_N$ low-frequency modulation
$f_{hub}$ frequency deviation of the modulation
$f_{NKo}$ carrier frequency of the upper adjacent channel
$f_{NKu}$ carrier frequency of the lower adjacent channel
$f_O$ oscillator frequency
$f_{Gen}$ frequency of the signal generator 35
$f_u$ lowest frequency of the radio frequency band
$\omega_{Index}=2*\pi*f_{Index}$=circuit frequency in question
$U_H$ amplitude of the high-frequency carrier
$U_S$ amplitude of the fixed-frequency oscillator

The invention claimed is:

1. A reception system having a switching arrangement for suppressing change-over interference in a base band range of a multi-antenna scanning diversity system, comprising:
   a) a plurality of antennas;
   b) a diversity processor for receiving antenna signals from said plurality of antennas and which is adapted to generate antenna change-over signals for changing over to a different antenna signal if interference reception conditions are present;
   c) an interference suppression circuit situated in a base band part of the system for receiving interference-masking-signals, which are derived in said diversity processor from switching signals for changing over to a different antenna signal;
   d) an interference detector for checking for interference in the reception signal, said interference detector being in communication with said diversity processor, said interference detector for creating switching signal pulses for changing over to a different antenna signal and for causing a pulse-like signature signal which is fed into a signal path of the reception signals;
   e) a coupling element, for coupling in a pulse like signature signal with the antenna reception signals for time marking a change-over process that occurs in coordination with switching wherein said coupling element, and
   f) a reception channel filter of said reception system that limits a frequency band, wherein said reception channel filter is disposed downstream from said coupling element;
   wherein said interference suppression circuit initiates interference masking from a base band signature signal formed after said reception channel filter,
   said reception system further comprising:
   a frequency converter;
   an oscillator;
   an FM demodulator;
   an interference masking unit; and
   a reception channel filter, which is structured as an IF filter wherein said IF signal is passed to said diversity processor to test for interference in said reception signal wherein said IF filter is followed by said FM demodulator, wherein said FM demodulator is followed by said interference masking unit, wherein said audio signal is passed to said interference suppression circuit contained in the unit and also passed to said signature signal evaluation, wherein said signature signal evaluation produces an interference masking signal that is present at an output of said signature signal evaluation, wherein said interference masking signal is passed to said interference suppression circuit to trigger interference masking, so that an audio signal that has been purified of switching interference is present at an output of said interference masking unit.

2. A reception system as in claim 1, further comprising at least one diversity unit which includes said diversity processor, said diversity processor comprising said antenna signal change over switch, said interference detector, said signature signal formation and said signature signal switch, wherein said diversity unit further comprises a selection device, an HF line, and a receiver wherein said plurality of antennas and said HF line feed into said receiver, wherein said HF line further includes an IF signal coupled into said HF line, wherein said IF signal is fed into said selection device and which said IF signal is also fed into said interference detector.

3. The reception system as in claim 2, further comprising an oscillator oscillation signal selectively coupled in and out by way of said selection device, and wherein said selection device is situated in said diversity unit, and said receiver, and wherein said oscillator oscillation signal is passed to said signature signal formation to form a signature signal.

4. The reception system according to claim 2, further comprising a tunable oscillator, and a ramp function transducer, wherein said tunable oscillator is present in said signature signal formation unit, wherein said tunable oscillator is tuned by said ramp function transducer, so that its oscillation frequency is changed in a few microseconds, proceeding from the lowest frequency of the ultra-short-wave frequency band, towards an increasing frequency, and additively superimposed on the reception signal, as a signature signal, so that when the band limit of the reception channel is reached, a pulse is derived as an interference masking signal at the output of said FM demodulator, because of the resulting frequency jump, in a differentiation circuit situated in said interference masking unit.

5. The reception system according to claim 1, further comprising a switch wherein the signature signal is formed as a sine-shaped oscillation as the signature signal carrier, having a sufficiently great frequency distance ($f_S$) from the current frequency of the HF carrier oscillation ($f_H$) of the reception channel, and the signature signal carrier is superimposed onto the reception signal in said signature signal switch;

wherein said switch is controlled by means of the switching signal pulses, in pulse-like manner, and thus a sufficiently great frequency interference deviation pulse is contained in the marked reception signal.

6. The reception system according to claim 5, further comprising a signal generator and a frequency mixer, disposed in said signature signal formation unit and wherein said said frequency mixer is adapted to receive an oscillator oscillation signal and an output signal of said signal generator and wherein a frequency of said signal generator is set in fixed manner, based on a knowledge of the intermediate frequency and the desired frequency departure of the signature signal carrier which is present at the output of said frequency mixer from the high-frequency carrier of the reception signal, and wherein the signature signal carrier is additively superimposed on the reception signal in said coupling element, by way of said switch which is controlled by the switching signal pulses, so that a pulse is derived as an interference masking signal at the output of the FM demodulator, in a differentiation circuit situated in the interference masking unit, because of the resulting frequency jump pulse.

7. The reception system according to claim 6, wherein said signature signal formation unit generates a pulse series having a predetermined pulse frequency, and wherein said signature signal formation unit is triggered by a switching signal pulse by means of alternating closing and opening of said switch, and wherein said interference masking unit further comprises a frequency-selective pulse evaluation and a pulse former for configuring the interference masking signal.

8. The reception system according to claim 5, further comprising a frequency converter and a fixed-frequency oscillator, having an inherent frequency $f_S$ that is present in said signature signal formation unit, to which the reception signal and the output signal of said fixed-frequency oscillator are passed, and wherein the signature signal, formed at the output of said signature signal formation unit, is formed by means of the reception signal offset by the frequency departure $f_S$; and wherein said switch which is controlled by the switching signal pulse wherein the signature signal is fed into the signal path of the reception signals, in a pulse-like manner, so that the momentary frequency of the signature signal deviates from the momentary frequency of the reception signal that occurs at the moment of the pulse, by the inherent frequency $f_S$ of said fixed-frequency oscillator, in pulse-like manner.

9. The reception system as in claim 8, wherein said frequency converter is formed from two symmetrical mixers, to the first output of which the reception signal is passed, in each instance, whereby these reception signals, however, are offset at the two first inputs by the phase angle of approximately $\pi/2$, relative to one another, and to the second output of which the output signal of the fixed-frequency oscillator is passed, in each instance, whereby these signals, however, are also offset by the phase angle of approximately $\pi/2$, relative to one another, and the signature signal is formed by addition of the output signals of the two symmetrical mixers.

10. The reception system according to claim 9, wherein said two symmetrical mixers each further comprise first and second inputs, and wherein said two symmetrical mixers receive a phase difference of the reception signal of $\pi/2$ that prevails at said first inputs of said two symmetrical mixers;

wherein the system further comprises:
a −45° HF phase rotation element coupled to an input of one symmetrical mixer and
a +45° HF phase rotation element coupled to an in put of another symmetrical mixer of said two symmetrical mixers;

wherein the system further comprises:
an additional −45° LF phase rotation element coupled to at least one symmetrical mixer of said two symmetrical mixers;
an additional +45° LF phase rotation element coupled to at least another symmetrical mixer of said two symmetrical mixers;

wherein the phase difference of the signal of said fixed-frequency oscillator of $\pi/2$ that prevails at said second inputs of the two symmetrical mixers is brought about using:
said additional −45° LF phase rotation element coupled to said at least one symmetrical mixer; and
said additional +45° LF phase rotation element at the other of said two symmetrical mixers, wherein said 45° HF phase rotation elements are formed from RC elements, in the case of which $\pi/4$ phase conditions are fulfilled approximately at the center frequency of the FM frequency band.

11. The reception system according to claim 10, wherein said frequency converter signal amplification is selected so that an amplitude of the signature signal is approximately equal to the amplitude of the high-frequency oscillation in the reception signal, so that when the signature signal occurs in the signal at the output of said coupling element, said coupling element only receives a desired frequency deviation pulse, and not any significant amplitude jump.

12. The reception system as in claim 8, wherein said interference detector, said the signature signal formation unit, and said signature signal switch are disposed in said receiver, wherein said receiver is coupled along said intermediate-frequency plane ahead of said IF filter, and wherein said reception signal in said intermediate frequency plane is passed to said signature signal formation, and wherein said phase rotation elements for turning on the two first inputs of said two symmetrical mixers are structured for the IF carrier frequency of the IF reception channel.

13. The reception system according to claim 1, wherein said the interference detector, said signature signal formation unit, and said coupling element are disposed in said receiver;
wherein said coupling element is coupled along an intermediate frequency plane ahead of said IF filter,
wherein said signature signal formation unit further comprises a signal generator, and a switch,
wherein said switch disposed in said signature signal formation unit produces an oscillation frequency of which has the desired frequency departure ($f_S$) from the intermediate-frequency carrier ($f_Z$), and whose oscillations, initiated by switching signal pulses, is additively superimposed on the reception signal in the intermediate-frequency plane, in pulse-like manner.

14. The reception system according to claim 13, wherein said switch in said signature signal formation unit is controlled by the switching signal pulse and feeds the signature signal into the signal path of the reception signals, in pulse-like manner, so that the momentary frequency of the signature signal deviates from the momentary frequency of the reception signal, at a moment that the pulse occurs, by the inherent frequency $f_S$ of the fixed-frequency oscillator, in pulse-like manner.

15. The reception system as in claim 13, wherein, said signature signal formation unit and said coupling element are disposed in said receiver, and wherein said interference detector is situated in said diversity unit, and the switching signal pulses are passed to said receiver by way of at least one selection device and the HF line, and there are passed to the switch in said coupling element.

16. The reception system according to claim 13, wherein said coupling element is structured as a signal blending-in device for constant superimposition of the signature signal, and thereby a rise time, a pulse size, and a pulse duration of the frequency interference deviation pulse are set.

17. The reception system according to claim 13 wherein said interference suppression circuit is unchangeably predetermined in said FM radio receiver, and wherein said interference suppression circuit initiates interference masking by means of a frequency interference deviation pulse having a related combination of rise time, pulse peak value, and pulse duration, which is set to provide reliable initiation of interference masking.

18. The reception system according to claim 1, further comprising a frequency converter disposed in said receiver, an oscillator having its output coupled to said frequency converter, and said FM demodulator is also disposed in said receiver, wherein, the system further comprises:

a noise generator for generating a noise signal that is sufficiently large to cover the frequency band of FM radio, and wherein the signature signal is formed by said noise signal, thereby initiating interference masking in said interference suppression circuit, in place of said signature signal.

19. A reception system having a switching arrangement for suppressing change-over interference in a base band range of a multi-antenna scanning diversity system, comprising:
 a) a plurality of antennas;
 b) a diversity processor for receiving antenna signals from said plurality of antennas and which is adapted to generate antenna change-over signals for changing over to a different antenna signal if interference reception conditions are present;
 c) an interference suppression circuit situated in a base band part of the system for receiving interference-masking-signals, which are derived in said diversity processor from switching signals for changing over to a different antenna signal;
 d) an interference detector for checking for interference in the reception signal, said interference detector being in communication with said diversity processor, said interference detector for creating switching signal pulses for changing over to a different antenna signal and for causing a pulse-like signature signal which is fed into a signal path of the reception signals;
 e) a coupling element, for coupling in a pulse like signature signal with the antenna reception signals for time marking a change-over process that occurs in coordination with switching wherein said coupling element, and
 f) a reception channel filter of said reception system that limits a frequency band, wherein said reception channel filter is disposed downstream from said coupling element,
 wherein said interference suppression circuit initiates interference masking from a base band signature signal formed after said reception channel filter, and
 wherein said interference detector generates said signature signal prior to generating an antenna change over signal and wherein said pulse duration $t_i$ of said pulse-like signature signal is relatively small in comparison with a time duration $t_a$ of said interference masking.

20. A reception system having a switching arrangement for suppressing change-over interference in a base band range of a multi-antenna scanning diversity system, comprising:
 a) a plurality of antennas;
 b) a diversity processor for receiving antenna signals from said plurality of antennas and which is adapted to generate antenna change-over signals for changing over to a different antenna signal if interference reception conditions are present;
 c) an interference suppression circuit situated in a base band part of the system for receiving interference-masking-signals, which are derived in said diversity processor from switching signals for changing over to a different antenna signal;
 d) an interference detector for checking for interference in the reception signal, said interference detector being in communication with said diversity processor, said interference detector for creating switching signal pulses for changing over to a different antenna signal and for causing a pulse-like signature signal which is fed into a signal path of the reception signals;
 e) a coupling element, for coupling in a pulse like signature signal with the antenna reception signals for time marking a change-over process that occurs in coordination with switching wherein said coupling element, and
 f) a reception channel filter of said reception system that limits a frequency band, wherein said reception channel filter is disposed downstream from said coupling element,
 wherein said interference suppression circuit initiates interference masking from a base band signature signal formed after said reception channel filter; and
 further comprising a signature signal formation unit disposed in said diversity processor wherein said signature signal formation is turned on by a switching signal pulse wherein said switching signal pulse occurs in connection with said antenna change-over signal that is slightly delayed as compared with said signature signal, when disadvantageous conditions are present, wherein said signature signal is superimposed onto said reception signal.

* * * * *